US010432728B2

United States Patent
Dachille et al.

(10) Patent No.: US 10,432,728 B2
(45) Date of Patent: Oct. 1, 2019

(54) AUTOMATIC IMAGE SHARING WITH DESIGNATED USERS OVER A COMMUNICATION NETWORK

(71) Applicant: Google LLC, Mountain View, CA (US)

(72) Inventors: Frank Dachille, Mountain View, CA (US); Anil Sabharwal, Rozelle (AU); Kedar Kanitkar, Mountain View, CA (US); James Gallagher, Sunnyvale, CA (US); Timothy Novikoff, Mountain View, CA (US); David Lieb, San Francisco, CA (US)

(73) Assignee: Google LLC, Mountain View, CA (US)

( * ) Notice: Subject to any disclaimer, the term of this patent is extended or adjusted under 35 U.S.C. 154(b) by 24 days.

(21) Appl. No.: 15/898,182

(22) Filed: Feb. 15, 2018

(65) Prior Publication Data

US 2018/0337994 A1 Nov. 22, 2018

Related U.S. Application Data

(60) Provisional application No. 62/507,756, filed on May 17, 2017.

(51) Int. Cl.
*H04L 29/08* (2006.01)
*G06F 3/0484* (2013.01)
(Continued)

(52) U.S. Cl.
CPC ...... *H04L 67/1097* (2013.01); *G06F 3/04842* (2013.01); *G06F 16/583* (2019.01);
(Continued)

(58) Field of Classification Search
CPC ........... G06K 9/00288; G06K 9/00221; G06K 9/00711; G06K 9/00; G06K 2009/00738;
(Continued)

(56) References Cited

U.S. PATENT DOCUMENTS 6,222,939 B1 4/2001 Wiskott et al.
D451,536 S 12/2001 Cornille et al.
(Continued)

FOREIGN PATENT DOCUMENTS

CN 101167066 4/2008
CN 102265649 11/2011
(Continued)

OTHER PUBLICATIONS

EPO, International Search Report for International Patent Application No. PCT/US2018/018447, dated May 24, 2018, 4 Pages.
(Continued)

*Primary Examiner* — Ninos Donabed
(74) *Attorney, Agent, or Firm* — IP Spring

(57) ABSTRACT

Implementations relate to automatic sharing of images with designated users over a communication network. In some implementations, a method includes causing display of images in a user interface on a first device, each of the images depicting a different person. The images are obtained from a library of images associated with a first user. A selection of a particular image of the images is received based on user input, and a person identifier is determined indicating a particular person depicted in the selected image. The person identifier is designated as a person sharing criterion. A first image not included in the images is obtained and programmatically analyzed to determine that the first image depicts a person that matches the person sharing criterion, and an access permission is updated to grant access to the first image to a second user of a second device over a communication network.

20 Claims, 8 Drawing Sheets

(51) Int. Cl.
  *G06F 21/32*   (2013.01)
  *G06F 21/62*   (2013.01)
  *G06Q 50/00*   (2012.01)
  *G06F 16/583*  (2019.01)
  *H04L 29/06*   (2006.01)

(52) U.S. Cl.
  CPC .......... *G06F 21/32* (2013.01); *G06F 21/6245* (2013.01); *G06Q 50/01* (2013.01); *H04L 67/42* (2013.01)

(58) Field of Classification Search
  CPC .. G06K 9/00228; G06K 9/325; G06K 9/6269; H04N 21/44008; H04N 21/84; H04N 21/2187; H04N 21/23418; H04N 21/23424; H04N 21/4722; H04N 21/8405; G06F 16/583; G06F 16/23; G06F 21/00; G06F 21/32
  See application file for complete search history.

(56) References Cited

U.S. PATENT DOCUMENTS

| | | | |
|---|---|---|---|
| 6,421,358 B1 | 7/2002 | Stimmel et al. | |
| 6,513,014 B1 | 1/2003 | Walker et al. | |
| 6,557,041 B2 | 4/2003 | Mallart | |
| 6,917,703 B1 | 7/2005 | Steffens et al. | |
| 6,940,998 B2 | 9/2005 | Garoutte | |
| 6,947,976 B1 | 9/2005 | Devitt et al. | |
| 7,099,510 B2 | 8/2006 | Jones et al. | |
| 7,298,960 B1 | 11/2007 | Taylor | |
| 7,489,946 B2 | 2/2009 | Srinivasan et al. | |
| 7,512,829 B2 | 3/2009 | Mital et al. | |
| 7,539,747 B2 | 5/2009 | Lucovsky et al. | |
| 7,552,068 B1 | 6/2009 | Brinkerhoff | |
| 7,620,902 B2 | 11/2009 | Manion et al. | |
| 7,668,405 B2 | 2/2010 | Gallagher | |
| 7,804,426 B2 | 9/2010 | Etcheson | |
| 7,812,998 B2 | 10/2010 | Miers | |
| 7,844,482 B1 | 11/2010 | Larson | |
| 7,849,481 B2 | 12/2010 | Moon et al. | |
| 7,903,904 B1 | 3/2011 | Loeb et al. | |
| 7,916,976 B1 | 3/2011 | Kedikian | |
| 7,917,859 B1 | 3/2011 | Singh et al. | |
| 8,085,982 B1 | 12/2011 | Kim et al. | |
| 8,194,940 B1 | 6/2012 | Kiyohara et al. | |
| 8,270,684 B2 | 9/2012 | Kiyohara | |
| 8,332,512 B1 | 12/2012 | Wu et al. | |
| 8,358,811 B2 | 1/2013 | Adam et al. | |
| 8,359,285 B1 | 1/2013 | Dicker et al. | |
| 8,359,540 B2 | 1/2013 | Darling | |
| 8,370,639 B2 * | 2/2013 | Azar | G06F 21/32 713/186 |
| 8,380,039 B2 | 2/2013 | Luo et al. | |
| 8,385,950 B1 | 2/2013 | Wagner | |
| 8,412,773 B1 | 4/2013 | Chapweske et al. | |
| D687,461 S | 8/2013 | Tyler et al. | |
| 8,571,331 B2 | 10/2013 | Cifarelli | |
| D696,266 S | 12/2013 | D'Amore et al. | |
| 8,630,494 B1 | 1/2014 | Svendsen | |
| 8,634,603 B2 | 1/2014 | Kiyohara et al. | |
| 8,730,397 B1 | 5/2014 | Zhang | |
| 8,761,523 B2 | 6/2014 | Cok et al. | |
| 8,798,336 B2 * | 8/2014 | Nechyba | G06K 9/00228 382/118 |
| 8,914,483 B1 | 12/2014 | Dixon et al. | |
| D729,846 S | 5/2015 | Lee | |
| D730,381 S | 5/2015 | Zhong et al. | |
| 9,122,645 B1 | 9/2015 | Amidon et al. | |
| 9,195,912 B1 * | 11/2015 | Huang | G06K 9/00288 |
| D750,131 S | 2/2016 | Perez et al. | |
| 9,311,310 B2 | 4/2016 | Ioffe et al. | |
| D756,377 S | 5/2016 | Connolly et al. | |
| D757,749 S | 5/2016 | Butcher | |
| D757,790 S | 5/2016 | Ostrowski et al. | |
| 9,391,792 B2 | 7/2016 | Yeskel et al. | |
| 9,418,370 B2 | 8/2016 | Jackson et al. | |
| 10,051,103 B1 | 8/2018 | Gordon et al. | |
| 2003/0171930 A1 * | 9/2003 | Junqua | G07C 9/00103 704/275 |
| 2003/0214128 A1 | 11/2003 | Roberts et al. | |
| 2004/0073615 A1 | 4/2004 | Darling | |
| 2004/0174434 A1 * | 9/2004 | Walker | H04N 1/32128 348/211.3 |
| 2005/0010470 A1 | 1/2005 | Marino | |
| 2005/0021822 A1 | 1/2005 | Cherkasova et al. | |
| 2005/0105396 A1 | 5/2005 | Schybergson | |
| 2005/0187943 A1 | 8/2005 | Finke-Anlauff et al. | |
| 2006/0048059 A1 | 3/2006 | Etkin | |
| 2006/0112080 A1 | 5/2006 | Chen et al. | |
| 2006/0125930 A1 | 6/2006 | Mindrum et al. | |
| 2006/0159007 A1 | 7/2006 | Frutiger et al. | |
| 2006/0234769 A1 | 10/2006 | Srinivasan et al. | |
| 2006/0287105 A1 | 12/2006 | Willis | |
| 2007/0022447 A1 | 1/2007 | Arseneau et al. | |
| 2007/0043583 A1 | 2/2007 | Davulcu et al. | |
| 2007/0219949 A1 | 9/2007 | Mekikian | |
| 2007/0250901 A1 | 10/2007 | McIntire et al. | |
| 2007/0260361 A1 | 11/2007 | Etcheson | |
| 2007/0266047 A1 | 11/2007 | Cortes et al. | |
| 2007/0294177 A1 | 12/2007 | Volk et al. | |
| 2008/0005761 A1 | 1/2008 | Repasi et al. | |
| 2008/0086511 A1 | 4/2008 | Takao | |
| 2008/0114844 A1 | 5/2008 | Sanchez et al. | |
| 2008/0133526 A1 | 6/2008 | Haitani et al. | |
| 2008/0133697 A1 | 6/2008 | Stewart et al. | |
| 2008/0136930 A1 | 6/2008 | Nagai | |
| 2008/0144135 A1 | 6/2008 | Miers | |
| 2008/0184139 A1 | 7/2008 | Stewart et al. | |
| 2008/0186926 A1 | 8/2008 | Baio et al. | |
| 2008/0189175 A1 | 8/2008 | Chan | |
| 2008/0201299 A1 | 8/2008 | Lehikoinen et al. | |
| 2008/0209010 A1 | 8/2008 | Zitnick, III et al. | |
| 2008/0301736 A1 | 12/2008 | Heilbron et al. | |
| 2009/0019902 A1 | 1/2009 | Baranek | |
| 2009/0070412 A1 | 3/2009 | D'Angelo et al. | |
| 2009/0199093 A1 | 6/2009 | Chakravarty | |
| 2009/0171873 A1 | 7/2009 | Dolin et al. | |
| 2009/0191902 A1 | 7/2009 | Osbourne | |
| 2009/0234876 A1 | 9/2009 | Schigel et al. | |
| 2009/0248692 A1 | 10/2009 | Tsukagoshi et al. | |
| 2009/0248703 A1 | 10/2009 | Tsukagoshi et al. | |
| 2009/0276531 A1 | 11/2009 | Myka et al. | |
| 2009/0279794 A1 | 11/2009 | Brucher et al. | |
| 2009/0319472 A1 | 12/2009 | Jain et al. | |
| 2010/0063961 A1 | 3/2010 | Guiheneuf et al. | |
| 2010/0088336 A1 | 4/2010 | Johnston et al. | |
| 2010/0124378 A1 | 5/2010 | Das et al. | |
| 2010/0158315 A1 | 6/2010 | Martin | |
| 2010/0169389 A1 | 7/2010 | Weber et al. | |
| 2010/0198880 A1 | 8/2010 | Petersen | |
| 2010/0223663 A1 | 9/2010 | Morimoto et al. | |
| 2010/0232656 A1 | 9/2010 | Ryu | |
| 2010/0241945 A1 | 9/2010 | Chen et al. | |
| 2010/0250633 A1 | 9/2010 | Hannuksela et al. | |
| 2010/0262916 A1 | 10/2010 | Jones et al. | |
| 2010/0315664 A1 | 12/2010 | Miers | |
| 2010/0318611 A1 | 12/2010 | Curtin et al. | |
| 2011/0066743 A1 | 3/2011 | Hurley et al. | |
| 2011/0072035 A1 | 3/2011 | Gaucas et al. | |
| 2011/0080424 A1 | 4/2011 | Peters et al. | |
| 2011/0099199 A1 | 4/2011 | Stalenhoef et al. | |
| 2011/0137709 A1 | 6/2011 | Mayer et al. | |
| 2011/0138003 A1 | 6/2011 | Yoon et al. | |
| 2011/0150324 A1 | 6/2011 | Ngan et al. | |
| 2011/0161423 A1 | 6/2011 | Pratt et al. | |
| 2011/0167136 A1 | 7/2011 | Naimark et al. | |
| 2011/0197200 A1 | 8/2011 | Huang | |
| 2011/0211737 A1 | 9/2011 | Krupka et al. | |
| 2011/0214077 A1 | 9/2011 | Singh et al. | |
| 2011/0238631 A1 | 9/2011 | Cortes et al. | |
| 2011/0270923 A1 | 11/2011 | Jones et al. | |
| 2011/0276513 A1 | 11/2011 | Erhart et al. | |
| 2011/0295667 A1 | 12/2011 | Butler | |

(56) References Cited

U.S. PATENT DOCUMENTS

| | | |
|---|---|---|
| 2011/0296536 A1 | 12/2011 | Muller et al. |
| 2012/0007995 A1 | 1/2012 | Barrett |
| 2012/0016948 A1 | 1/2012 | Sinha |
| 2012/0023129 A1 | 1/2012 | Vedula et al. |
| 2012/0027256 A1 | 2/2012 | Kiyohara |
| 2012/0030194 A1 | 2/2012 | Jain |
| 2012/0038665 A1 | 2/2012 | Strietzel |
| 2012/0047147 A1 | 2/2012 | Redstone et al. |
| 2012/0072428 A1 | 3/2012 | Kao et al. |
| 2012/0079396 A1 | 3/2012 | Neer et al. |
| 2012/0082378 A1 | 4/2012 | Peters et al. |
| 2012/0092685 A1 | 4/2012 | Barrett |
| 2012/0100869 A1 | 4/2012 | Liang et al. |
| 2012/0102409 A1 | 4/2012 | Fan et al. |
| 2012/0109901 A1 | 5/2012 | Mase |
| 2012/0114296 A1 | 5/2012 | Luo et al. |
| 2012/0122554 A1 | 5/2012 | Paquet et al. |
| 2012/0123867 A1 | 5/2012 | Hannan |
| 2012/0124630 A1 | 5/2012 | Wellen |
| 2012/0136689 A1 | 5/2012 | Ickman et al. |
| 2012/0153016 A1 | 6/2012 | Slaby et al. |
| 2012/0158871 A1 | 6/2012 | Amano et al. |
| 2012/0179664 A1 | 7/2012 | Auerbach et al. |
| 2012/0213404 A1 | 8/2012 | Steiner |
| 2012/0214568 A1 | 8/2012 | Herrmann |
| 2012/0220314 A1 | 8/2012 | Altman et al. |
| 2012/0221687 A1 | 8/2012 | Hunter et al. |
| 2012/0246003 A1 | 9/2012 | Hart et al. |
| 2012/0251011 A1 | 10/2012 | Gao et al. |
| 2012/0278387 A1 | 11/2012 | Garcia et al. |
| 2012/0324589 A1 | 12/2012 | Nukala et al. |
| 2013/0006882 A1 | 1/2013 | Galliani |
| 2013/0013683 A1 | 1/2013 | Elliott |
| 2013/0066963 A1 | 3/2013 | Odio et al. |
| 2013/0101220 A1 | 4/2013 | Bosworth et al. |
| 2013/0114865 A1* | 5/2013 | Azar ............ G06F 21/32 382/118 |
| 2013/0117365 A1 | 5/2013 | Padmanabhan et al. |
| 2013/0117692 A1 | 5/2013 | Padmanabhan et al. |
| 2013/0124311 A1 | 5/2013 | Sivanandan et al. |
| 2013/0129232 A1 | 5/2013 | Cok et al. |
| 2013/0141529 A1 | 6/2013 | Sathish |
| 2013/0156275 A1 | 6/2013 | Amacker et al. |
| 2013/0166639 A1 | 6/2013 | Shaffer et al. |
| 2013/0167212 A1* | 6/2013 | Azar ............ G06F 21/32 726/7 |
| 2013/0223696 A1* | 8/2013 | Azar ............ G06K 9/00892 382/118 |
| 2013/0232251 A1 | 9/2013 | Pauley |
| 2013/0305287 A1 | 11/2013 | Wong et al. |
| 2013/0339180 A1 | 12/2013 | LaPierre et al. |
| 2014/0002342 A1 | 1/2014 | Fedorovskaya et al. |
| 2014/0002644 A1 | 1/2014 | Fedorovskaya et al. |
| 2014/0016837 A1* | 1/2014 | Nechyba ............ G06K 9/00228 382/118 |
| 2014/0033072 A1 | 1/2014 | Zheng et al. |
| 2014/0095637 A1 | 4/2014 | Cropper |
| 2014/0123275 A1* | 5/2014 | Azar ............ H04W 12/06 726/19 |
| 2015/0005010 A1 | 1/2015 | Zhang et al. |
| 2015/0036000 A1* | 2/2015 | Cho ............ G06F 1/1686 348/207.1 |
| 2015/0081783 A1 | 3/2015 | Gong et al. |
| 2015/0135337 A1 | 5/2015 | Fushman et al. |
| 2015/0143256 A1 | 5/2015 | Panchawagh-Jain et al. |
| 2015/0262208 A1* | 9/2015 | Bjontegard ........ G06Q 30/0205 705/7.31 |
| 2015/0288632 A1 | 10/2015 | Zheng et al. |
| 2015/0338915 A1 | 11/2015 | Publicover et al. |
| 2016/0063313 A1* | 3/2016 | Sandholm ............ H04L 9/3231 382/118 |
| 2016/0149956 A1* | 5/2016 | Birnbaum ............ H04L 63/101 726/1 |
| 2016/0203699 A1* | 7/2016 | Mulhern ............ G06F 19/3418 340/573.1 |
| 2016/0359957 A1 | 12/2016 | Laliberte |
| 2017/0063852 A1* | 3/2017 | Azar ............ G06F 21/32 |
| 2017/0318077 A1* | 11/2017 | Borse ............ G06F 16/23 |

FOREIGN PATENT DOCUMENTS

| | | |
|---|---|---|
| JP | 2000-067057 | 3/2000 |
| JP | 2004-222056 | 8/2004 |
| JP | 2006-101095 | 4/2006 |
| JP | 2007-249821 | 9/2007 |
| JP | 2008-077445 | 4/2008 |
| JP | 2008-146174 | 6/2008 |
| JP | 2008-146230 | 6/2008 |
| JP | 2008-225586 | 9/2008 |
| JP | 2009-146079 | 7/2009 |
| JP | 2009-359238 | 11/2009 |
| JP | 2010-237751 | 10/2010 |
| JP | 2010-263621 | 11/2010 |
| JP | 2011-526013 | 9/2011 |
| JP | 2012-514276 | 6/2012 |
| JP | 2009009204 | 1/2015 |
| KR | 10-2009-0080063 | 7/2009 |
| KR | 10-2010-0120282 | 11/2010 |
| KR | 10-2012-0029861 | 3/2012 |
| KR | 10-2012-0034600 | 4/2012 |
| WO | 2007113462 | 10/2007 |
| WO | 2007/135871 | 11/2007 |
| WO | 2007/135971 | 11/2007 |
| WO | 2008/045701 | 4/2008 |
| WO | 2009/076555 | 6/2009 |
| WO | 2009082814 | 7/2009 |
| WO | 2010/075049 | 7/2010 |
| WO | 2010/108157 | 9/2010 |
| WO | 2011/001587 | 1/2011 |
| WO | 2011/149961 A2 | 12/2011 |
| WO | 2012/015919 | 2/2012 |
| WO | 2014/178853 | 11/2014 |

OTHER PUBLICATIONS

EPO, Written Opinion for International Patent Application No. PCT/US2018/018447, dated May 24, 2018, 6 Pages.

EPO, Office Action mailed in EP Application No. 13737075.5, dated Jul. 6, 2017, 5 pages.

APO, First Examination Report mailed in Australian Application No. 2016219660, dated May 12, 2017, 4 Pages.

CIPO, Notice of Allowance in Canadian Application No. 2885504., May 2, 2017, 1 Page.

SIPO, First Office Action in Chinese Application No. 201380055926. 4, May 31, 2017, 16 Pages.

USPTO, Office Action mailed in U.S. Appl. No. 13/929,498, dated Jul. 13, 2017, 16 Pages.

USPTO, Office Action mailed in U.S. Appl. No. 15/205,602, dated Jul. 13, 2017, 6 Pages.

PCT, International Search Report and Written Opinion for International Patent Application No. PCT/US13/77726, dated Apr. 6, 2015, 5 Pages.

JPO, Notification of Reasons for Refusal in Japanese Application No. 2013-554527, dated Aug. 18, 2015, 14 Pages.

PCT, International Preliminary Report on Patentability in PCT Application No. PCT/US2013/077726, dated Jun. 30, 2015, 5 Pages.

USPTO, Non-Final Rejection for U.S. Appl. No. 13/050,195, filed Mar. 17, 2011, dated Mar. 28, 2014, 12 Pages.

USPTO, Notice of Allowance for U.S. Appl. No. 13/661,425, dated Dec. 8, 2015, 14 Pages.

KIPO, Notice of Preliminary Rejection in Korean Patent Application No. 10-2015-7002159, dated Jan. 26, 2016, 15 pages.

USPTO, Final Rejection for U.S. Appl. No. 13/661,425, dated Mar. 10, 2015, 17 pages.

APO, Notice of Acceptance for Application No. 2013334606, dated Nov. 18, 2016, 2 pages.

(56) References Cited

OTHER PUBLICATIONS

APO, Patent Examination Report No. 1 for Australian Patent Application No. 2013334606 [LE-0339-01-AU], dated Nov. 25, 2015, 2 pages.
USPTO, Non-Final Rejection for US Appl. No. 14/571,213, dated Sep. 24, 2015, 21 pages.
USPTO, Non-Final Rejection for U.S. Appl. No. 13/661,425, dated Sep. 18, 2014, 24 pages.
USPTO, Notice of Allowance for U.S. Appl. No. 13/050,195, filed Mar. 17, 2011 dated Aug. 15, 2014, Aug. 15, 2014, 27 pages.
SIPO, Chinese First Office Action in Chinese Patent Application No. 201180046353, dated Aug. 31, 2015, 29 pages.
APO, Second Examination Report in Australian Application No. 2016219660, dated Sep. 25, 2017, 3 pages.
SIPO, Notification of Grant in Chinese Application No. 201380040026.2, dated Jul. 27, 2017, 3 pages.
USPTO, Notice of Allowance for U.S. Appl. No. 13/534,555, filed Jun. 27, 2012, dated Oct. 23, 2015, 31 pages.
USPTO, Non-Final Rejection for U.S. Appl. No. 13/542,379, filed Jul. 5, 2012, dated Nov. 19, 2015, 42 pages.
JPO, Decision of Rejection and Decision to Reject the Amendments in Japanese Application No. 2015-520534, dated Aug. 7, 2017, 6 pages.
EPO, European Patent Office, Examination Report related to EP Patent Application No. EP11741726.1, dated Jan. 23, 2015, 6 pages.
EPO, European Patent Office. Revised Office Action in EP 11741726.1, dated May 28, 2015, 6 pages.
JPO, Notice of Allowance for Japanese Application No. 2013-554527, dated Nov. 20, 2015, 6 pages.
EPO, Supplementary Search Report in European Application No. 13786816.2, dated Jun. 3, 2016, 7 Pages.
JPO, First Office Action in JP Application No. 2015-538160, dated Jun. 20, 2016, 7 Pages.
JPO, Notice of Reasons for Rejection in Japanese Application No. 2015-520534, dated Jan. 16, 2017, 8 pages.
PCT. International Search Report and the Written Opinion of the International Search Authority in related PCT Application No. PCT/US2013/066414, dated Jan. 29, 2014, 8 pages.
JPO, Notice of Reason for Rejection for Japanese Application No. 2013-554527, dated Aug. 18, 2015, 9 pages.
APO, "Australian Patent Examination Report No. 3", in Australian Application No. 2012217920, dated Aug. 19, 2016.
EPO, "Extended European Search Report", EP Application No. 13737075.5, dated Jan. 13, 2016, 8 Pages.
"Flickr-Photo Sharing", URL: http://www.flickr.com/, accessed on Sep. 27, 2011, Sep. 27, 2011, 7 pages.
"Geotags and location-based social networking", Social Media Roundup, Feb. 2012, Feb. 2012.
JPO, Notice of Allowance for U.S. Application No. 2015-539724, Dec. 12, 2016, 3 pages.
JPO, Notice of Allowance for Japanese Patent Application No. 2015-538160, dated Dec. 5, 2016, 3 Pages.
JPO, Notice of Reasons for Rejection, Japanese Application No. 2015-539724, dated Apr. 4, 2016, 9 Pages.
KIPO, Notice of Allowance in Korean Patent Application No. 10-2015-7010982, dated Sep. 29, 2016, 2 Pages.
KIPO, Notice of Last Preliminary Rejection, in Korean Patent Application No. 10-2015-7002159, Aug. 10, 2016.
KIPO, Notice of Preliminary Rejection, Korean Patent Application No. 10-2015-7013481, dated Feb. 5, 2016, 11 Pages.
CIPO, Notice of Allowance, for Canadian Application No. 2,885,504 filed Oct. 23, 2013, dated May 2, 2017, 1 page.
JPO, Notice of Reasons for Rejection, Japanese Application No. 2015-520534, dated Mar. 7, 2016, 9 pages.
"Picasa Web Albums", Retrieved from URL:http//picasa.google.com/, accessed on Sep. 27, 2011, Sep. 27, 2011, 1 page.
USPTO, Non-Final Rejection in U.S. Appl. No. 13/929,498, dated Feb. 13, 2017, 32 Pages.
USPTO, Non-Final Rejection cited in U.S. Appl. No. 13/219,835, dated Jul. 15, 2016, pp. 49.

Alt, et al., "Location-based Crowdsourcing: Extending Crowdsourcing to the Real World", Proceedings NordiCHI, Oct. 16-20, 2010, pp. 13-22.
APO, Examination Report for Australian Patent Application No. 2012217920, dated Nov. 25, 2014, 3 pages.
Chandramouli, et al., "Semantic Structuring and Retrieval of Event Chapters in Social Photo Collections", Proceedings of the International Conference on Multimedia Information Retrieval, MIR, New York, New York, Jan. 1, 2010, 507-515.
CIPO, Office Action for Canadian Patent Application No. 2,885,504, dated May 25, 2016, 4 pages.
EPO, Communication Pursuant to Rules 161(1) and 162 EPC for European Patent Application No. 16788835.3, Nov. 23, 2017, 2 pages.
EPO, Written Opinion for International Patent Application No. PCT/US2012/024874, dated Aug. 18, 2013, 4 pages.
EPO, International Search Report for International Patent Application No. PCT/US2012/024874, dated Aug. 23, 2012, 4 pages.
EPO, International Search Report for International Patent Application No. PCT/US2011/045532, dated Jan. 19, 2012, 4 pages.
KIPO, Notice of Allowance in Korean Application No. 10-2015-7002159, dated Jun. 16, 2017, 2 Pages.
KIPO, Notice of Final Rejection in Korean Application No. 10-2015-7002159, dated Feb. 10, 2017, 7 Pages.
EPO, "Communication pursuant to Article 94(3) EPC in European Application No. 12711045.0", dated Feb. 10, 2017, 6 pp.
EPO, International Search Report and Written Opinion for International Patent Application No. PCT/US2016/054024, dated Dec. 7, 2016, 19 pages.
EPO, Summons to Attend Oral Proceedings Pursuant to Rule 115(1) EPC for European Patent Application No. 11741726.1, May 29, 2017, 7 pages.
Google Inc., "Automatic Media Sharing Via Shutter Click", PCT Application No. PCT/US2011/045532, filed Jul. 27, 2011.
Hayakawa, "Remarkable Software at the Cutting Edge", MacPeople. ASCII Media Works Inc., vol. 15, No. 8, Aug. 1, 2009, p. 176.
Huang, et al., "Agent-mediated Personal Photo Sharing", International Journal of Electronic Business management, vol. 5, No. 1, Electronic Business management Society, Taiwan, Mar. 1, 2007, 11-18.
International Bureau of WIPO, International Preliminary Report on Patentability for International Patent Application No. PCT/US2016/054024, dated Apr. 12, 2018, 14 pages.
PCT, International Preliminary Report on Patentability for International Patent Application No. PCT/US2013/048318, dated Jan. 8, 2015, 4 pages.
PCT International Preliminary Report on Patentability for International Patent Application No. PCT/US2012/024874, dated Aug. 21, 2013, 5 pages.
JPO, Office Action/Rejection (with English translation) for Japanese Patent Application No. 2013-521938, dated Mar. 10, 2015, 8 pages.
KIPO, Notice of Allowance mailed in Korean Patent Application No. 10-2015-7013481.
KIPO, Notice of Preliminary Rejection (with English translation) for Korean Patent Application No. 10-2013-7004789, dated May 1, 2017, 10 pages.
KIPO, Notice of Preliminary Rejection (with English translation) for Korean Patent Application No. 10-2015-7010982, dated Mar. 8, 2016, 9 pages.
Liu, et al., "Video-Based Face Recognition Using Adaptive Hidden Markov Models", Proceedings of the IEEE Computer Society Conference on Computer Vision and Pattern Recognition 1, CVPR, USA, Jun. 2003, 340-345.
SIPO, Second Office Action (with English translation) for Chinese Patent Application No. 201180046353.X, dated Apr. 1, 2016, 14 pages.
SIPO, Notification of First Office Action mailed in Chinese application No. 201380040026.2, dated Nov. 28, 2016, 25 pages.
SIPO, Notification on Grant of Patent Right and Notification for Patent Registration Formalities for Chinese Patent Application No. 201180046353.X, dated Jul. 1, 2016, 4 pages.
SIPO, "Notification of First Office Action mailed in Chinese application No. 201380055474.X", dated Feb. 27, 2017, 25 pages.

(56) References Cited

OTHER PUBLICATIONS

Ting-Hsiang, et al., "Agent-Mediated Personal Photo Sharing", International Journal of Electronic Business management, vol. 5, Issue 1, Mar. 2007, pp. 11-18.
USPTO, Non-final Office Action for U.S. Appl. No. 13/188,879, dated Dec. 16, 2011, 10 pages.
USPTO, Non-final Office Action for U.S. Appl. No. 13/246,628, dated Dec. 16, 2011, 10 pages.
USPTO, Final Office Action for U.S. Appl. No. 14/149,483, dated Dec. 21, 2016, 10 pages.
USPTO, Final Office Action for U.S. Appl. No. 13/346,385, dated Feb. 5, 2016, 11 pages.
USPTO, Non-final Office Action for U.S. Appl. No. 13/346,385, dated Jun. 30, 2016, 12 pages.
USPTO, Non-final Office Action for U.S. Appl. No. 13/050,195, dated Jan. 29, 2013, 14 pages.
USPTO, Non-final Office Action for U.S. Appl. No. 13/542,379, dated Oct. 3, 2014, 14 pages.
USPTO, Non-final Office Action for U.S. Appl. No. 14/162,708, dated Sep. 27, 2016, 14 pages.
USPTO, Notice of Allowance for U.S. Appl. No. 13/534,555, dated Jun. 11, 2015, 15 pages.
USPTO, Final Office Action for U.S. Appl. No. 13/346,385, dated Oct. 20, 2016, 15 pages.
USPTO, First Action Interview, Office Action Summary for U.S. Appl. No. 15/277,927, dated Aug. 31, 2018, 38 pages.
USPTO, Non-final Office Action for U.S. Appl. No. 13/050,195, dated Mar. 28, 2014, 23 pages.
USPTO, First Action Interview, Pre-Interview Communication for U.S. Appl. No. 13/658,490, dated Mar. 18, 2014, 25 pages.
USPTO, Final Office Action for U.S. Appl. No. 13/658,490, dated Nov. 7, 2014, 27 pages.
USPTO, Notice of Allowance in U.S. Appl. No. 13/534,555, dated Mar. 8, 2016, 28 pages.
USPTO, Non-final Office Action for U.S. Appl. No. 13/929,498, dated Jul. 15, 2015, 29 pages.
USPTO, Final Office Action for U.S. Appl. No. 13/542,379, dated May 12, 2015, 30 pages.
USPTO, Final Office Action for U.S. Appl. No. 13/219,835, dated Oct. 9, 2013, 33 pages.
USPTO, Non-final Office Action for U.S. Appl. No. 13/219,835, dated Apr. 2, 2013, 36 pages.
USPTO, First Action Interview, Pre-Interview Communication for U.S. Appl. No. 15/277,927, dated May 30, 2018, 36 pages.
USPTO, Non-final Office Action for U.S. Appl. No. 13/219,835, dated Oct. 24, 2014, 40 pages.
USPTO, Non-final Office Action for U.S. Appl. No. 13/658,490, dated Jul. 2, 2015, 41 pages.
USPTO, Non-final Office Action for U.S. Appl. No. 13/346,385, dated Jul. 22, 2015, 43 pages.
USPTO, Final Office Action in U.S. Appl. No. 13/929,498, dated Feb. 25, 2016, 48 pages.
USPTO, Final Office Action for U.S. Appl. No. 13/219,835, dated Jun. 4, 2015, 48 pages.
USPTO, International Search Report and Written Opinion for International Patent Application No. PCT/US2013/048318, dated Dec. 9, 2014, 5 pages.
USPTO, Restriction Requirement for U.S. Appl. No. 29/540,842, dated Nov. 28, 2016, 5 pages.
USPTO, Notice of Allowance for U.S. Appl. No. 13/658,490, dated Feb. 19, 2016, 54 Pages.
USPTO, Non-final Office Action for U.S. Appl. No. 13/590,354, dated Apr. 18, 2013, 6 pages.
USPTO, Non-final Office Action for U.S. Appl. No. 29/540,842, dated Jun. 30, 2016, 6 pages.
USPTO, Notice of Allowance for U.S. Appl. No. 13/246,628, dated Apr. 11, 2012, 7 pages.
USPTO, International Search Report and Written Opinion for International Patent Application No. PCT/US2013/066257, dated Apr. 25, 2014, 7 pages.
USPTO, First Action Interview, Office Action Summary for U.S. Appl. No. 13/658,490, dated Jul. 24, 2014, 7 pages.
USPTO, First Action Interview, Office Action Summary for U.S. Appl. No. 14/149,483, dated Jul. 26, 2016, 7 pages.
USPTO, Notice of Allowance for Design U.S. Appl. No. 29/540,842, dated Mar. 8, 2017, 7 pages.
USPTO, Notice of Allowance for U.S. Appl. No. 13/188,879, dated May 22, 2012, 7 pages.
USPTO, Notice of Allowance for U.S. Appl. No. 13/590,354, dated Sep. 13, 2013, 8 pages.
USPTO, "Final Office Action in U.S. Appl. No. 14/162,708", dated Mar. 22, 2017, 23 pages.
USPTO, "Final Rejection in U.S. Appl. No. 13/219,835", dated Feb. 27, 2017, 39 Pages.
USPTO, "Non-Final Office Action in U.S. Appl. No. 13/929,498", dated Feb. 13, 2017, 32 pages.
EPO, Written Opinion of the International Preliminary Examining Authority for International Patent Application No. PCT/US2018/018447, dated Apr. 10, 2019, 5 pages.
USPTO, Notice of Allowance for U.S. Appl. No. 15/277,927, dated Jul. 2, 2019, 40 pages.

* cited by examiner

AUTOMATIC IMAGE SHARING WITH DESIGNATED USERS OVER A COMMUNICATION NETWORK

CROSS REFERENCE TO RELATED APPLICATIONS

The present application claims priority to U.S. Provisional Patent Application No. 62/507,756, filed May 17, 2017 and titled AUTOMATIC IMAGE SHARING WITH DESIGNATED USERS, which is incorporated herein by reference in its entirety.

BACKGROUND

The popularity and convenience of digital cameras as well as the widespread of use of Internet communications have caused user-produced images such as photographs to become ubiquitous. For example, users of Internet platforms and services such as email, forums, photograph repositories, and network services post images for themselves and others to view. Images can be posted by users to a network service for private viewing (e.g., friends or other small groups of users) and/or public viewing by many users.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatic sharing of images with designated users over a communication network. In some implementations, a computer-implemented method includes causing display of a plurality of images in a user interface on a first device to a first user, where each of the plurality of images depicts a different person, and the plurality of images are obtained from a library of images associated with the first user. A selection of a particular image of the plurality of images is received based on user input received by the first device, and a person identifier is determined indicating a particular person depicted in the selected particular image, where the person identifier is designated as a person sharing criterion. A first image associated with the first user is obtained from the library of images associated with the first user, where the first image is not included in the plurality of images. The method programmatically analyzes the first image to determine that the first image depicts a person (e.g., in pixels of the first image) that matches the person sharing criterion. Based on the determination that the first image depicts the person that matches the person sharing criterion, an access permission is updated for the first image of the library of images associated with the first user to grant access to the first image to a second user of a second device over a communication network.

Various implementations and examples of the method are described. For example, in some implementations, the person sharing criterion includes a face criterion that specifies a particular face identity, and programmatically analyzing the first image comprises applying an image classifier to determine that the first image depicts a face of the particular face identity, where applying the image classifier is based on pixel values of the pixels of the first image. In some implementations, updating the access permission for the first image is based on a confidence level of determining that the first image depicts the person that matches the person sharing criterion, where the confidence level meets a first threshold. In some examples, the method includes checking whether the confidence level does not meet the first threshold and meets a second threshold that indicates a lesser confidence that the first image depicts the person that matches the person sharing criterion, and in response to determining that the conference level meets the second threshold, causing the first image to be displayed for selection by user input to the first device from the first user to update the access permission for the first image to grant access to the second user.

In some implementations, updating the access permission of the first image includes automatically adding the first image to an image library of the second user. In some implementations, adding the first image to the image library of the second user comprises adding the first image to an image album in the image library of the second user, where the image album is designated to store images that match the person sharing criterion. In some implementations, image data of the first image is stored on a server device in communication with the first device over the communication network, and a first data pointer referring to the image data of the first image is stored on the first device, where updating the access permission of the first image includes sending a second data pointer referring to the image data of the first image to the second device over the communication network.

In some implementations, programmatically analyzing the first image includes determining whether the first image meets one or more additional sharing criteria. In some examples, the one or more additional sharing criteria include an image feature criterion that specifies an image content feature, and programmatically analyzing the first image includes applying an image classifier to determine a feature vector that includes a plurality of content features of the first image, where the feature vector is based on pixel values of the first image, and comparing the feature vector with the image feature criterion to determine whether the first image matches the image feature criterion. In further examples, the one or more additional sharing criteria include a time criterion, and programmatically analyzing the first image includes determining a creation time for the first image based on timestamp metadata associated with the first image, and comparing the creation time with the time criterion to determine whether the first image matches the time criterion. In further examples, the one or more additional sharing criteria include a location criterion, and the location criterion specifies a particular location, and programmatically analyzing the first image includes determining a location associated with the first image based on one or more of: location metadata associated with the first image and a content feature detected as depicted in one or more pixels of the first image, and comparing the location associated with the first image with the location criterion to determine whether the first image matches the particular location.

In some implementations, the method further includes, in response to the determination that the first image depicts the person that matches the person sharing criterion, initiating a delay period associated with the first user for the first image, assigning a status indicator to the first image, where the status indicator indicates a first status that the first image is to be shared with the second user, determining whether user input from the first user is received at the first device during the delay period that indicates that the first image is not to be shared with the second user, and if it is determined that the user input is received, updating the status indicator to a second status that indicates the first image is not to be shared with the second user, where updating the access permission of the first image is in response to an expiration of the delay period and the status indicator indicating the first status.

In some implementations, a computer-implemented method includes selecting a plurality of images from an image library associated with a user, and causing the plurality of images to be displayed in a user interface on a user device of the user. The method includes receiving a selection of a particular image of the plurality of images based on user input received by the user device, and determining a person identifier indicating a particular person depicted in the selected particular image. The person identifier is designated as a person save criterion and included in stored automatic save criteria associated with the user, where the automatic save criteria include one or more person identifiers that each identify a different person. The method includes receiving, over a communication network, an indication that the user has been granted access to a first image associated with a different user and provided in a stored different library of images associated with the different user, where the first image is not included in the image library associated with the user. The indication includes an access permission for the first image, where the indication is based on share input received at a different user device of the different user. In response to receiving the indication that the user has been granted access to the first image, the method obtains the first image and the stored automatic save criteria associated with the user. The method programmatically analyzes the first image to determine whether the first image depicts a person (e.g., in pixels of the first image) that matches one of the one or more person identifiers of the automatic save criteria. In response to determining that the first image depicts the person that matches one of the one or more person identifiers, the first image is added to the image library associated with the user. For example, the first image is accessible to be displayed on the user device of the user.

Various implementations and examples of the method are described. For example, in some implementations, each of the plurality of images depicts a unique person that is not depicted in other images of the plurality of images, where each of the plurality of images is associated with a different person identifier. In some examples, each of the plurality of images is selected from a different cluster of images from a plurality of clusters of images, where each cluster of images includes one or more images depicting the unique person.

In some implementations, automatically adding the first image to the image library includes storing a data pointer on the user device, where the data pointer points to first image data stored on a server device, and the first image data is associated with the first image. In some implementations, the automatic save criteria includes one or more additional save criteria, where the additional save criteria include a location save criterion that specifies a location indicated by user input received at the user device, and/or a time-based save criterion that specifies a time period indicated by user input received at the user device, and the method further includes determining whether metadata of the first image meets one or more of the additional save criteria, where automatically adding the first image to the image library is additionally in response to determining that the metadata of the first image meets the one or more of the additional save criteria.

In some implementations, the person save criterion includes a face save criterion that specifies a particular face identity, and programmatically analyzing the first image includes applying an image classifier to determine that the first image depicts a face of the particular face identity. Applying the image classifier is based on pixel values of the pixels of the first image. In some implementations, the method further includes causing to be displayed a first user interface element by the user device, where the first user interface includes a selectable option to accept access to one or more images associated with the different user, and the method further includes receiving user input from the user indicative of an acceptance of access to the one or more images, where selecting the plurality of images from the image library and causing the plurality of images to be displayed are in response to receiving the user input indicative of the acceptance. In some examples, the method further includes, in response to receiving the user input indicative of the acceptance, causing to be displayed a second user interface that enables the user to update an access permission of one or more images in the image library associated with the user to grant access to the one or more images to the different user.

In some implementations, a system includes a storage device and at least one processor configured to access the storage device and configured to perform operations. The operations include causing display of a plurality of images in a user interface on a first device to a first user, where each of the plurality of images depicts a different person, and where the plurality of images are obtained from a library of images associated with the first user. A selection of a particular image of the plurality of images is received based on user input received by the first device. The operations include determining a person identifier indicating a particular person depicted in the selected particular image, where the person identifier is designated as a person sharing criterion. The operations include obtaining a first image associated with the first user, where the first image is provided in the library of images associated with the first user, and the first image is not included in the library of images. The operations include programmatically analyzing the first image to determine that the first image depicts a person, e.g., in pixels of the first image, that matches the person sharing criterion, and, based on the determination that the first image depicts the person that matches the person sharing criterion, updating an access permission for the first image in the library of images associated with the first user to grant access to the first image to a second user of a second device over a communication network. For example, the operations include causing the first image to be added to an image album in an image library of the second user, where the image album is designated to store images that match the person sharing criterion.

In some implementations, a computer-program product comprising portions of program code which, when executed by a computing device, cause the computing device to perform operations similar to those described above for the respective methods or systems.

DETAILED DESCRIPTION

Figure 1:
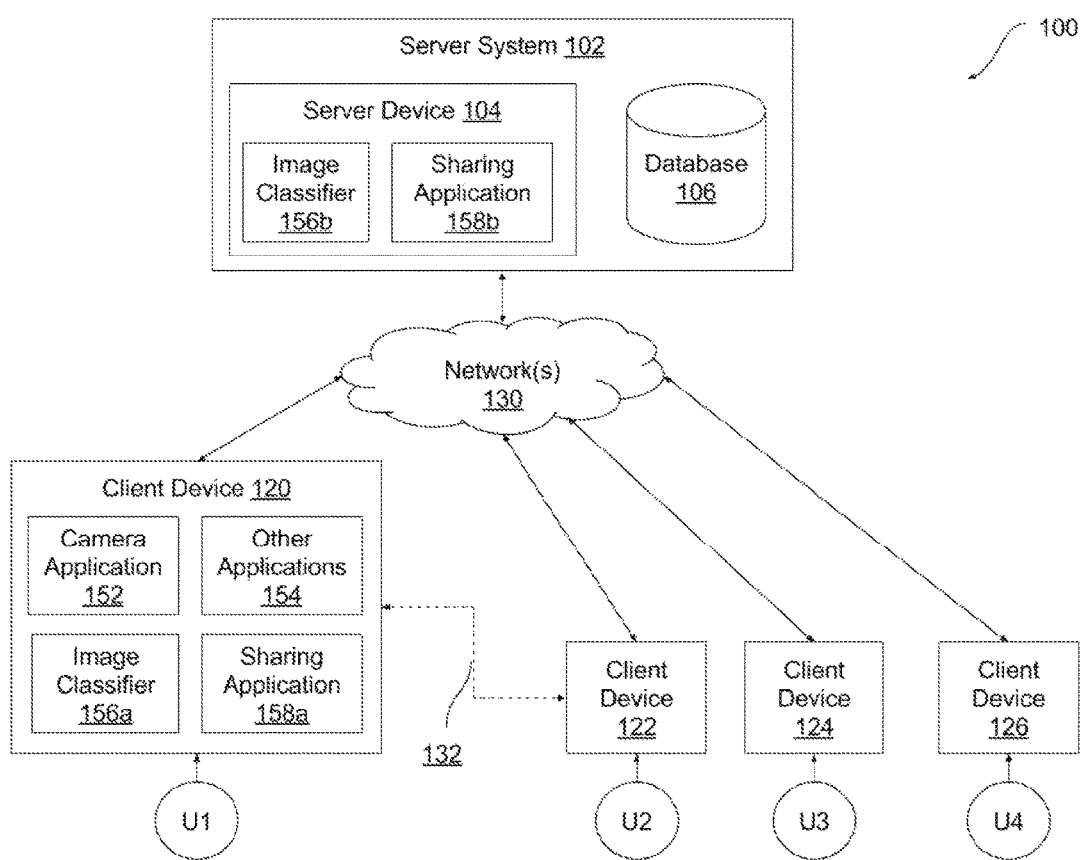
FIG. 1 is a block diagram of an example network environment which may be used for one or more implementations described herein.

Implementations of this application relate to automatic image sharing with designated users using devices communicating over a network. In some implementations, images stored in and added to a sending user's image library are programmatically analyzed, if permitted by the sending user. If it is determined that the image matches one or more sharing criteria that have been specified by the sending user, access to the image is automatically granted to a recipient user specified by the sending user. In some implementations, the recipient user may indicate a preference to automatically save certain images from the shared images that they have been granted access to when such images meet automatic save criteria. In these implementations, the images that meet the automatic save criteria are automatically, without user input, added to the recipient's image library.

Described features include receiving selections of sharing criteria images to specify sharing criteria based on user input from a sending (sharing) user. Sharing criteria images can be obtained and processed from the image library of the sending user. For example, a person identifier can be determined in a selected criteria image and used as a person sharing criterion. Images in the user's image library are analyzed based on the sharing criteria and designated as shared images based on matches to the sharing criteria. Sharing criteria can include various image characteristics including image content features, time of capture, location of capture, etc.

At a recipient user device, save criteria images can be displayed and selections from these save criteria images can specify automatic save criteria based on user input. Save criteria images can be obtained and/or processed from the image library of the recipient user. Shared images from a sending user can be compared to the automatic save criteria, such as person save criteria, to determine which shared images are to be automatically stored in the image library of the recipient user. Automatic save criteria can include one or more image characteristics including image content features, time of capture, location of capture, etc.

The techniques described herein can automatically grant recipients access to images from a sending user, and can automatically save images that meet a user's criteria. The techniques therefore reduce or eliminate the need for users to take specific actions with devices to share images and provide convenience of automatically building an image library relevant to the user. In one example, described sharing techniques reduce the burden to a user of manually sharing large amounts of photos with a family member on an ongoing basis, and reduces frustration of a user not having access, on an ongoing basis, to all of the photos of their family that the family member captures.

Automatically sharing images with one or more designated persons on an ongoing basis provides technical advantages. For example, captured images can be shared with a designated person immediately without requiring additional operations and actions on a device and without requiring processing, storage, and display of additional applications (e.g., separate sharing user interface, messaging, email, posting to social networks, etc.). Such sharing of images may be displayed with lower latency than an interface requiring use of separate interfaces or applications for sharing, by elimination of time required for providing separate interfaces or applications to share the images. A further technical advantage is that processing costs and device resources required for using separate interfaces or applications for sharing of images are reduced. For example, applying predefined sharing criteria and saving criteria to the automatic sharing of images saves system processing resources typically used to display interfaces and data for manual browsing and selection of images to share and to save to particular storage. The use of various sharing criteria and save criteria allow relevant images to be shared and/or saved in image libraries without requiring additional processing and storage resources in manual browsing, selection, deletion, and confirmation of images to share and/or store. This can be useful, for example, to a user that wishes to share photos, yet who has a large collection of photos to sort through, or a user that takes a lot of photos. Recipient users of shared images can be provided with save criteria options that allow relevant images to be automatically, without user intervention, stored in their image libraries. In some implementations, notifications can be periodically provided on the recipient device to indicate newly-shared images are available to a user for viewing on that user's device. Users can thus be enabled to share more images with each other on an ongoing basis having strong user interest, thus building a stronger sharing and collaborative network between the users.

Device memory use and processing resource use can be reduced by reducing user input and displayed interfaces used in viewing, selection, and sending of images by users using large sets of device options. Furthermore, described features can reduce the processing and communication resources used by devices of recipient users by reducing user input and displayed interfaces used in viewing, curating, and selection of shared images to store. Consequently, a technical effect of one or more described implementations is that operation of devices is reduced in computational time and resources expended to obtain results, thus providing a technical solution to the technical problem of extensive device resources required for generation, transmission, and viewing of images shared among multiple devices and users across communication networks.

Herein, features relating to images are described. Other types of content can also be used with features described herein. For example, videos (e.g., movies) having multiple image frames can be included in the term "images" and, e.g., analyzed for sharing and/or storing as described herein. Similarly, content types such as documents, audio segments and files, games, and other media types can be similarly used with described features.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. In some implementations, server device 104 may provide an image classifier 156b and/or a sharing application 158b.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems, e.g., server system 102. In some implementations, the server system 102 may provide appropriate data to the client devices such that each client device can receive communicated content or shared content uploaded to the server system 102 and/or network service.

In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide camera application 152, image classifier 156a, sharing application 158a, and one or more other applications 154. Client devices 122-126 may also provide similar applications. For example, camera application 152 may provide a user of a respective client device (e.g., users U1-U4 with the ability to activate and utilize a camera (not shown) of client device 122 to capture an image and/or video. For example, camera application 152 may be a software application that executes on client device 120.

In some implementations, camera application 152 may provide a camera user interface. In some implementations, the camera user interface of camera application 152 may provide user U1 with an option to choose a particular camera on client device 120, e.g., if client device 120 has a plurality of cameras, e.g., a front camera and a back camera. Further, the camera user interface of camera application 152 may provide user U1 with the ability to control one or more settings of the chosen camera, e.g., an aperture, a shutter speed, a zoom level, etc. The camera user interface of camera application 152 may also provide user U1 with the ability to control an operational mode, e.g., a slow-motion mode, a single-image capture mode, a video capture mode, etc. In some implementations, camera application 152 may provide users with options related to image settings (e.g., image resolution, image size, image orientation, image format such as raw, JPEG, etc.) and/or image effects (e.g., a lens blur effect, a panorama effect, etc.). In some implementations, camera application 152 may provide access to settings, operational modes, image processing effects, etc. via a user interface, e.g., displayed on client device 120. Images and/or video captured by a camera of client device 120 may be stored, e.g., in local storage of client device 120, and/or storage provided by server system 102.

In some implementations, client device 120 may include image classifier 156a. Image classifier 156a may be implemented using hardware and/or software of client device 120, as described with reference to FIG. 8. In different implementations, image classifier 156a may be a standalone image classifier, e.g., executed on any of client devices 120-124, or may work in conjunction with image classifier 156b provided on server system 102. Image classifier 156a and image classifier 156b may provide image analysis functions, based on user permissions, e.g., assigning an image to one or more clusters, based on analyzing the image to identify one or more faces depicted in the image. In some examples, image analysis and image feature recognition can be performed using any of a variety of techniques, including machine learning techniques as described below.

In some implementations, image classifier 156a on the client device 120 can be used instead of image classifier 156b on the server. In some implementations, server storage of U1's face identification data (e.g., face models as described herein) can be omitted, and face identification data is stored locally on the client's device 120 in the custody and control of the user of the client device. In some implementations, the client device 120 can communicate with the server 102 to send selected shared images directly to the recipient user (e.g., via a recipient user server account and/or to the recipient client device). Correspondingly, in some implementations, an image classifier 156a and face identification data can be provided on the recipient's client device to determine automatic save criteria and select shared images for storage in the recipient user's image library, without use of image classifier 156b and face identification data on a server.

In some implementations, client device 120 may also include sharing application 158a. Sharing application 158b may be implemented using hardware and/or software of client device 120. In different implementations, sharing application 158a may be a standalone application, e.g., executed on any of client devices 120-124, or may work in conjunction with sharing application 158b provided on server system 102. Sharing application 158a and sharing application 158b may enable a user (e.g., a sending user) to grant one or more others access to images in the user's image library. Sharing application 158a and sharing application 158b may further enable a user (e.g., a recipient) to set up automatic saving functionality to save one or more images to which other users have granted access in the recipient's image library. Images that are granted access may include, e.g., an image captured by client device 120, an image stored on client device 120, an image accessed by client device 120, e.g., over network 130, etc.

In some implementations, client device 120 may include one or more other applications 154. For example, other applications 154 may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, shared images/video, etc.) and so on. In some implementations, one or more of other applications 154 may be standalone applications that execute on client device 120. In some implementations, one or more of other applications 154 may access a server system that provides data and/or functionality of other applications 154.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device. In some implementations, any of server system 102, and/or one or more client devices 120-126 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to broadcast a content post to a broadcast area, and/or can output a notification indicating that a content post has been received by the device and the device is in the defined broadcast area for the post. The communication program can display or otherwise output transmitted content posts and received content posts, e.g., in any of a variety of formats.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
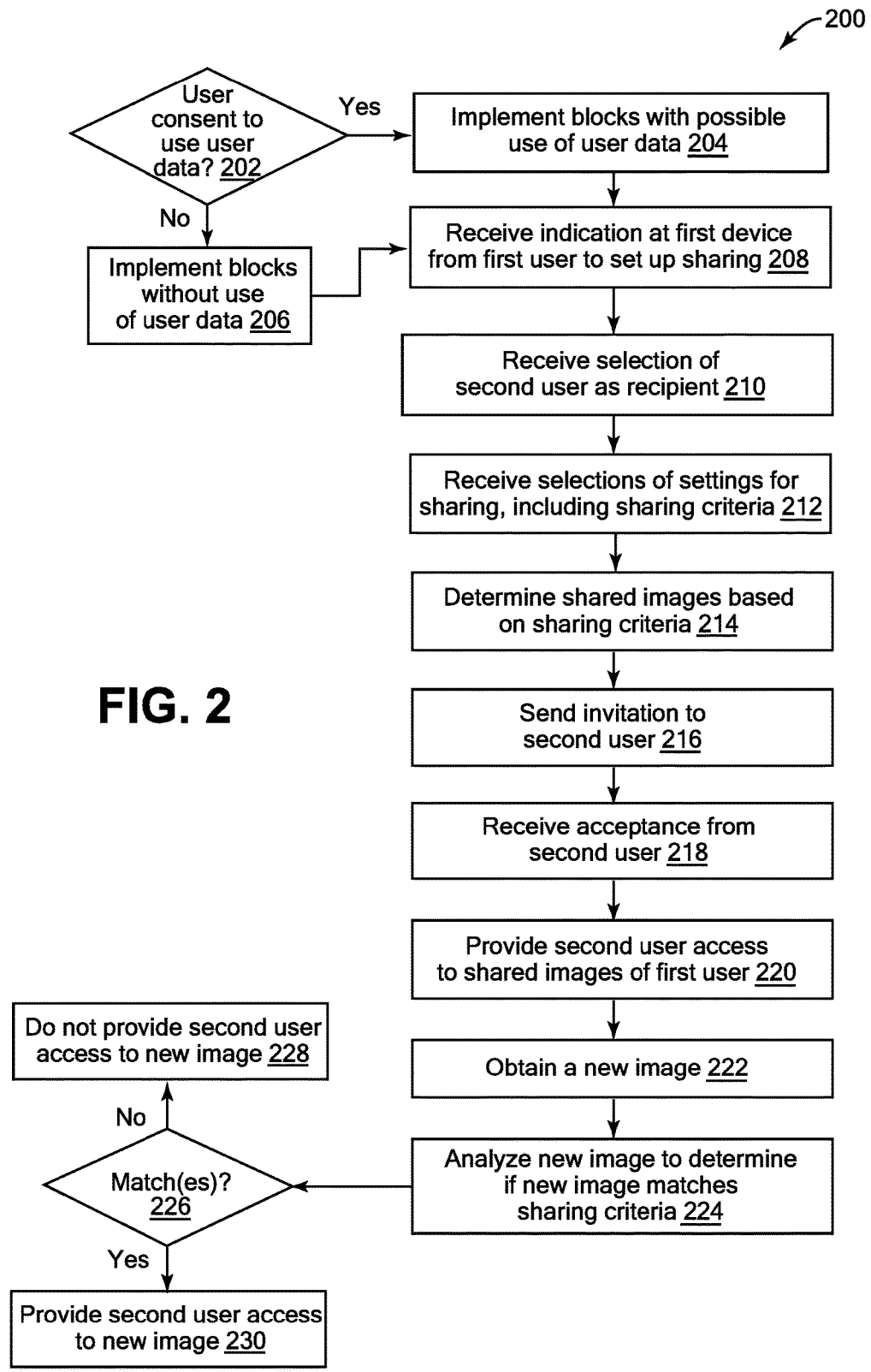
FIG. 2 is a flow diagram illustrating an example a method to provide features to share images from a sending user, according to some implementations.

FIG. 2 is a flow diagram illustrating an example a method 200 to share images from a sending user, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device. The various examples and implementations described for method 200 can be combined in various permutations or combinations.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application being initiated by a user, receiving one or more images that have been newly uploaded to or accessible by the system, a predetermined time period having expired since the last performance of method 200, and/or one or more other conditions occurring which can be specified in settings read by the method. In some implementations, such conditions can be specified by a user in stored custom preferences of the user.

In one example, the first device can be a camera, cell phone, smartphone, tablet computer, wearable device, or other client device that can receive content input (e.g., image capture) by a user to the client device, and can perform the method 200. In another example, a client device or server device can receive one or more images uploaded from one or more users or received over a network connection, and can perform the method 200 for the one or more images. In another example, a client device can send an image to a server over a network, and the server can process the content using method 200. Some implementations can initiate method 200 based on user input. A user (e.g., operator or end-user) may, for example, have selected the initiation of the method 200 from a displayed user interface, e.g., application user interface or other user interface.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemagraphs where a portion of the image includes motion while other portions are static, etc.) and a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, an emoji, or other image), videos, or dynamic images. Text, as referred to herein, can include alphanumeric characters, emojis, symbols, or other characters.

In block 202, it is checked whether user consent (e.g., user permission) has been obtained to use user data in the implementation of method 200. For example, user data can include messages sent or received by a user, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, blocks are to be implemented without use of user data and/or generic or publicly-accessible and publicly-usable data.

In block 208, user input is received at a first device from a first user (e.g., sending user) to set up sharing of images (and/or other content items or media items) with a particular user (also referred to as a second user, recipient, or recipient user). For example, the particular user may be a partner, spouse, designated friend, etc. of the first user. For example, the user input can be received via a user interface displayed on the first device, and/or the user input can be input via an input device of the first device, e.g., touchscreen, physical control (e.g., pointing device, joystick, touchpad, etc.), voice command received by microphones of the first device, etc. In some implementations, a sharing setup interface is displayed in response to the user input. In some implementations, the sharing setup interface can be displayed automatically by the first device, e.g., based on user preferences, in response to an obtained image, etc.

In block 210, selection is received from the first user of an identification of a second user as the recipient user (or recipient) for the sharing of images, e.g., a second user different than the first user. In some implementations, if user consent has been obtained from the first user to access a social graph of the first user (e.g., social network, messaging network, e-mail network, etc.), various users that are socially connected to the first user can be presented for selection as a recipient user. For example, a menu of contacts stored in the first user's address book can be presented, from which the first user can input a selection. In another example, users from one or more user groups of the first user as organized and stored on a social networking service, users contacted via the first device as indicated in a stored call log, etc. can be presented for selection. In some implementations, a single user is selected as the recipient for the sharing of the images. In some implementations, multiple users can be selected as recipients for the sharing of the images. In some implementations, multiple users may not be selected as recipients for the automatic sharing of images as described herein, and only a single user may be selected as the recipient.

In block 212, selections are received from the first user of settings for the sharing of images, including sharing criteria. For example, the sharing criteria can specify one or more criteria characteristics, e.g., image characteristics such as depicted image features, that are compared to image characteristics of stored images. If a criteria characteristic matches an image characteristic of an image, the image is determined to be a match for sharing. Based on the specified sharing criteria, images from the image library of the first user are identified as images to which the second user (recipient user) is to be provided access. Sharing criteria can include time criteria, image content feature criteria (e.g., criteria based on image content or image features such as faces, etc.), location criteria, etc. Sharing criteria can be specified by the first user, e.g., via user input to the first device, via stored user preferences, etc.

In some implementations, time criteria can include one or more specified times, dates, or time/date ranges which a timestamp of an image is to match in order for the image to qualify as a shared image of the first user (where "times" can include dates). For example, an image timestamp can indicate a time of capture of the image by a camera or other device (or time of creation of a generated image). In some implementations, an image timestamp can indicate a time of last modification of the image by the first user (or any user), an upload time at which the image was received via upload over a network from a client device to a server, a time when the first user first gained access to the image, etc.

Time criteria can specify a variety of time periods (e.g., times or time ranges). Time criteria can specify one or more particular times, or time ranges of times or dates. For example, time criteria can specify a particular time (e.g., a start time or start date), and specify that images that have a timestamp after that particular time qualify as a shared image. The particular time can be specified as a time of day, a particular day or date, an event (e.g., a standard holiday, sports game, celebration, the date that the sending user first met the recipient, etc.). In further examples, time criteria can specify a time range (e.g., between a start time/date and an end time/date), e.g., which may coincide with a particular event (vacation, meeting, etc.). In some examples, when the sending user (first user) permits access to user data, the date that the sending user first met the recipient may be determined based on such data, e.g., the first user's stored calendar that indicates past event and planned events in the future. In another example, the sending user may input the date of the first meeting with the recipient. In various examples, the time criteria can specify that images that have a timestamp before the particular time (e.g., end time or end date) qualify as a shared image, or that have a timestamp within a specified period of time qualify as a shared image.

In some implementations, the particular time can be determined based on particular conditions of the first user, other users, the images, etc. For example, if user consent has been obtained, time criteria can specify a time period after the sending user first contacted the recipient user, e.g., using the first device (e.g., as indicated in a contact list, call log, message log, or other database indicating a history of previous communications of the first device, if user consent has been obtained), up to the present time. Images having a timestamp within that time period qualify as shared images.

Image content feature criteria can specify particular image content features or types of image content features that are visually depicted in the pixels of images. Image content features can include depictions of faces, persons (e.g., entire body or portion of body of a person), animals (e.g., identifiable animals such as pets, if user consent has been obtained), monuments (e.g., Eiffel Tower, Golden Gate Bridge, etc.), landscape features (e.g., trees, lakes, bridges, mountains, buildings, sky, sunset, etc.), physical objects (e.g., vehicles, articles, etc.), logos, objects indicating a utility image, etc. Particular image content features can be specified in image content feature criteria by an identifier (e.g., a person's name, Eiffel Tower, specific location name, name of pet, etc.), and types of image content features can be specified in the criteria by categories or classifications (e.g., dog, baby, truck, ball, etc.). Image content features can be detected in an image using one or more image detection and/or image recognition techniques.

In some implementations, machine learning techniques can be used to implement an image classifier to classify features such as regions and objects in images based on pixel values of the image. For example, a feature vector can be determined that includes a plurality of content features, and the feature vector can be compared with image content feature criteria to determine whether the image matches the image content feature criteria. The feature vector can be a condensed numerical representation of the visual pixel content of the image. For example, the feature vector can be a vector having a particular number of dimensions, with a value for each dimension. In some implementations, 128 or other number of dimensions can be used. In some implementations, the feature vector can be generated by a neural network based on the image pixel values (e.g., color values). In some implementations, one or more feature vectors can be determined from particular portions of the image, e.g., "local" image content features that are detected based on image detection or object recognition techniques (e.g., pattern matching, machine learning, etc.).

For example, image content features including faces (without identity), animals, objects, landscape features (foliage, buildings, sky, sunsets, etc.) can be detected. In some implementations, image features of a "utility image" can be detected, such as text indicating a depiction of a receipt in the image, shapes indicating a screen capture image of a video screen (e.g., a user interface displayed in a captured state), etc. Utility images depicting such features can be excluded from sharing in some implementations. In further examples, if a main subject of an image is determined (e.g., the largest detected feature in the image, a detected feature at center of image frame or other particular location, etc.), a feature vector can be created from the portion of the image depicting that main subject. In some implementations, a feature vector of the main subject of an image can be considered representative of the entire image.

In some implementations, sharing criteria can be specified as one or more object models, such as face models or models of other objects. A face model indicates the characteristics of a face such as dimensions, color, etc. of a face and facial features, which are associated with a particular person. This allows the method to detect various faces in different images, poses, angles, etc. and match those faces to sharing criteria face models to indicate that the depicted faces belong to the particular persons (e.g., person identifiers) associated with the face models and thus are to be shared if those face models are included in sharing criteria. If a face model is specified as sharing criteria, the system can determine faces in images that match the face model. A number of face models can be accessible to the method 200, e.g., stored locally on the first device of the first user.

In some implementations, the first device can store face models that are generated based on the images stored in the first user's image library. In some implementations, face models can be stored additionally or alternatively on network storage and/or a server accessible by the first device over a network, and such face models can also be used as image criteria. In some implementations, face models are maintained only in local storage of user devices and are not transmitted to servers over the network. In some implementations, face model clusters are provided, where each cluster represents a particular person (e.g., each cluster has an associated person identifier) and includes multiple face models that have been determined or confirmed to represent a particular person associated with the cluster. In some implementations, techniques including vector analysis (e.g., change in dark to light pixel values is captured, feature vectors of images compared to find similar image features) and/or skin texture analysis (e.g., surface texture analysis of features of skin of faces) can be used to detect image content features in the images, including faces.

Some implementations of image content feature criteria can include specified persons that, if any of those persons are detected to be depicted in an image, cause that image to qualify as a shared image. In some implementations, those specified persons are exclusively to be depicted in an image, with no unspecified persons depicted, for the image to qualify as a shared image. In some examples, the first user can input particular names of such persons, and/or can specify categories of persons (e.g., my children, family, work colleagues, people on my sports team, etc.).

In some examples, images from the first user's library (set) of images (e.g., "sharing criteria images") can be displayed on a device (e.g., the first device). The sharing criteria images can be selected to indicate sharing criteria, as described below. For example, save criteria images can be selected by input from the first user. Sharing criteria images can be selected in other ways, e.g., selected by the system based on stored user preferences and/or based on characteristics similar to other sharing criteria images, (e.g., having a time of capture or location of capture within a particular period of time or geographic distance of the times and locations associated with one or more other sharing criteria images, having the same type of image content features as other sharing criteria images, etc.). For example, characteristics of the sharing criteria images can be used as sharing criteria. Such sharing criteria can include image content feature criteria.

For example, sharing criteria images can depict sample faces from different, unique persons (or face models) depicted in the first user's library images, and images showing duplicate faces are not displayed in the menu (e.g., multiple images showing the face of the same person are not displayed). The first user can select one or more sharing criteria images to indicate one or more faces depicted in the selected sharing criteria images as face criteria, e.g., to identify persons that, if depicted in an image, qualify the image as a shared image. For example, in some implementations, one or more person identifiers are determined from a selected sharing criteria image based on detecting faces, and the person identifier is designated as a person sharing criterion. In some examples, a person sharing criterion can include a face criterion that specifies a particular face identity. In some implementations, a face model (or face model cluster) can have an associated face identity to identify the associated person.

Similarly, sharing criteria images can be displayed that depict image features other than faces, e.g., a sharing criteria image depicting a sunset, a landscape, a building, an animal, etc., which the user can select to indicate sharing criteria based on one or more of the depicted image features. For example, selecting a sharing criteria image depicting a sunset causes library images with sunsets to qualify as shared images.

In some implementations, sharing criteria are determined from particular image features in a sharing criteria image, where those image features have predetermined or specified characteristics, and sharing criteria are not determined from other image features depicted in the sharing criteria image that do not have such characteristics. In some implementations, the specified characteristics used for sharing criteria can be specified or indicated by user input, user preferences, device settings, etc. For example, particular types of image features can be used as, or indicate, sharing criteria, such as faces, animal types, landscape features, etc. In some examples, image features having a threshold size or greater size (e.g., a threshold percentage area of the total image area, threshold percentage number of pixels of the total number of pixels, threshold width, and/or height in pixels of total width and/or height of the image, etc.) can be used as sharing criteria, while image features smaller than the threshold size are not used as sharing criteria. In some examples, image features that are overlapping and/or have pixels (or a center) located within a particular threshold distance of the center of the image (or other particular location within the image area or frame) are used as sharing criteria, while other features outside such a threshold location are not used as sharing criteria. In further examples, image features that have specified colors, brightness, or other image characteristics can be used for sharing criteria.

Location criteria can specify particular locations which a location associated with an image is to match in order for the image to qualify as a shared image of the first user. For example, an image can be associated with metadata that includes a geographic location at which the image was captured. For example, the geographic location can be specified as coordinates (e.g., latitude and longitude), by an address (e.g., postal address), or in other ways. If a location associated with an image matches a location specified by the location criteria, the image qualifies as a shared image. Location criteria can be specified by the first user as distinguishing place names (e.g., Yankee Stadium, Golden Gate Park), by addresses (e.g., postal addresses, zip codes, telephone area codes, etc.), or in other ways. For example, a map can be displayed, e.g., by the first device, and the first user can select particular locations or areas/regions which are input as location criteria. In some implementations, location criteria can be specified by the first user as a label (e.g., category or classification), e.g., "home," "work," "school," etc., and, if consent has been obtained by the first user, the system can determine the particular geographic locations to which these labels correspond, e.g., by examining other user data of the first user such as contact information (specifying such locations), travel history of the first user (e.g., work or home indicated by time and length of presence at a particular location), communications of the first user (e.g., company email addresses, etc.), etc.

Other or additional sharing criteria can be used in some implementations. For example, sharing criteria can be based on visual image characteristics, user ratings, etc. Other sharing criteria examples are described in various sections this disclosure, and can include visual image characteristics including quality characteristics of images (e.g., blurriness, contrast, brightness, color noise, etc., where threshold levels of these characteristics can qualify an image as a shared image), etc.

In further examples, sharing criteria can include source storage locations for the shared images. For example, the sharing criteria can specify particular storage locations such as folders, groups, or other storage collections from which shared images are to be selected. In some examples, storage locations associated with particular application programs can be specified as sharing criteria, such that shared images are selected from those storage locations. For example, the particular application programs can be camera applications that are usable to capture images, chat applications that receive images from other users in chat conversations and text messages, communication applications that receive images from email, image editing applications that are usable to edit captured images (e.g., to add effects to images, to select a particular image from a set of images captured within a small time interval such as half a second, to add text or graphical elements to images, etc.) etc.

In further examples, sharing criteria can include particular users and/or devices that have provided images. For example, a particular user can be specified such that images that have been received from the particular user qualify as shared images. In some examples, particular user devices are specified (e.g., camera devices), such that images captured or created by those devices, or received from those devices, qualify as shared images.

In further examples, sharing criteria can include previous actions related to images by the first user, e.g., from a history of such actions, which can indicate the images to qualify as shared images. For example, previous displays and views, sharing to other users, selections, and other actions by the first user performed using the first device and/or other device to or on particular images can cause the particular images to qualify as shared images in FIG. 2. In some implementations, the types of previous actions that are considered to qualify images for sharing can be specified by the first user (e.g., in block 212 or in stored user preferences). In some implementations, one or more relevant periods of time can be specified by the first user (e.g., in block 212 or in stored user preferences), during which the previous actions were made (e.g., time of day, particular month or year, etc.).

In some implementations, images having characteristics that match particular criteria characteristics can be excluded from the images that are shared to the second user. For example, such criteria can be filtering criteria that cause particular images to be filtered from a set of shared images based on the characteristics of the images matching the filtering criteria.

In some implementations, one or more sharing criteria images can be displayed as suggested sharing criteria, and which allow user input from the first user to select at least one of the sharing criteria images to specify sharing criteria. In some examples, such sharing criteria images can display image content features that can be used as image criteria as described above, if sharing criteria images are selected by first user input. In further examples, some sharing criteria images can suggest other sharing criteria associated with the sharing criteria image, such as a time or date (the time or date of capture of the criteria image), location (the location of capture of the criteria image), etc., where this associated sharing criteria is selected if the criteria image is selected.

In some implementations, sharing criteria images can be images selected by the system from the first user's image library that have particular characteristics, e.g., were shared with other users (not the recipient user), viewed on the first user's device(s), or shared/viewed most frequently by first user input in the past (e.g., within a particular period of time prior to the current time). In some examples, sharing criteria images can depict content types that were previously selected or viewed by the first user and/or match stored preferences or settings set by the first user. In some examples, such sharing criteria images can be obtained from lists storing the most viewed or downloaded images by multiple users, from a network site that is accessed by the multiple users. Duplicative sharing criteria images, e.g., that depict content that is duplicative to other sharing criteria images, can be omitted from display. For example, if two images that depict the same person's face are determined to be sharing criteria images, one of these images can be omitted from display as a sharing criteria image.

In some implementations, sharing criteria images can be generated or modified from other images from the first user's image library, e.g., by editing the other images and/or modifying pixel values of the other images. For example, an image from the library can be cropped (e.g., by the system, or other system) such that the image post-cropping (e.g., the retained portion of the image after the cropping) is used as a sharing criteria image. In some examples, the system can crop (e.g., remove) areas of an image other than a portion that depicts a face to form a sharing criteria image. The sharing criteria image is a portion of the image depicting the face, such that the face is the only face depicted in the sharing criteria image. In some implementations, a sharing criteria image can be similarly generated for each face in an image (e.g., each face over a threshold size in pixel size). In another example, text or symbols can be added to an image to form a sharing criteria image, e.g., a name or other identifier of a depicted person, location, monument, etc. can be added.

In further examples of sharing settings, a delay period (e.g., grace period) can be specified by the first user. The delay period is a period of time that occurs after shared images have been determined by the system and before the recipient user has actually been granted access to images of the first user, during which the first user may designate particular images of those images to not be shared, e.g., not be offered or provided for second user access. For example, in response to the determination that a particular image matches the designated sharing criteria, a delay period can be provided during which the particular image is assigned a status indicator indicating a first status, where the first status indicates that the image is to be shared with the recipient user. A notification can be displayed by the first device indicating that the shared images are determined. In some examples, the notification provides a displayed option (e.g., selectable button or other displayed control) that causes the determined shared images to be displayed for user review.

In some implementations, the status indicator indicating the first status is modifiable and can be updated to a status indicator indicating a second status by first user input received during the delay period, where the second status indicates the image is not to be shared with the recipient user. If the delay period expires and the image still has the first status (e.g., the first user has not designated the particular image to be removed from being offered or provided for sharing to the recipient), access is provided to the image by the second user (as described below for block 220). If the image is assigned the second status based on first user input, the image is removed from sharing eligibility, e.g., removed from a stored list indicating the identifications of images to share with the recipient user. In some examples, the shared images can be stored or classified in a queue, and the first user may remove one or more of the shared images from the queue during the delay period (e.g., by providing user input selecting the one or more images displayed in a user interface), such that when the delay period expires, the second user is provided access to the (remaining) images in the queue.

In another example of the delay period, the delay period for an image can start after a particular amount of time (e.g., N minutes) have elapsed since the image was backed up, e.g., was saved to a server account from a device such as a client device. During this delay period, the first user can mark the image to not be shared via the sharing process of method 200. In some implementations, the delay period can be adjusted by user input from the first user.

In additional examples, the delay period can be applied for new images obtained by the first user or the first devices that are determined to be shared images, as described below for blocks 222-230.

In block 214, the shared images for the first user are determined based on the sharing criteria. For example, images are programmatically analyzed by the first device and/or other devices in communication with the first device, based on the sharing criteria, to determine which images qualify as shared images. The analyzed images can be compared to multiple sharing criteria, or one sharing criterion, to determine if they quality as shared images. In some implementations, different images can be compared to different sharing criteria, e.g., based on one or more characteristics of the images (image content features, visual (pixel) characteristics, time of capture, location of capture, etc.).

The images analyzed may be stored in one or more stored collections or albums associated with the first user (e.g., in an image library of the first user), e.g., on one or more servers, and/or stored in local storage of the first device or other client devices accessible to the first user, etc. In some implementations, other processes may affect which images of the image library are available for processing in block 214. In some implementations, archiving criteria that cause one or more images to be archived (removed from display in an image library, and/or omitted from being sent to a server for storage, etc.). Such archiving may remove one or more images of an image library from consideration as shared images using the sharing criteria.

In some implementations, sharing criteria are stored in local storage of the first device, and/or the shared images are determined by the first device. In some implementations, one or more sharing criteria can be stored at a server (or other device) remote from the first device (e.g., connectable to the first device over a network), and/or the server (or other device) can determine the shared images. In some implementations, both the first device and one or more remote devices store sharing criteria and/or determine the shared images.

In some implementations in which faces are detected in images of the first user's library of images, the persons of the faces are determined and these persons are compared to person sharing criteria (e.g., face criteria that specifies a particular face identity) determined in block 212. Shared images include those images determined to depict a person in pixels of the image that matches one or more person sharing criteria. Similarly, other image content features can be compared to other types of sharing criteria, and other image characteristics such as time and/or location can be compared to time and location sharing criteria to determine the shared images of the first user's image library. Images determined to qualify as shared images can be designated as shared images to be shared with the recipient (second user), e.g., a respective share designation can be associated with each shared image and stored in device storage.

In some implementations, determining a match between an image and one or more sharing criteria can be associated with a confidence level for the match between the image and one or more sharing criteria, where the confidence level can indicate the confidence in the match and/or a likelihood of the match being accurate. In one example, the closer the match is determined to be, the higher the confidence level assigned to the match. In some implementations, different confidence level thresholds can be employed, where the different thresholds indicate different tiers or categories of confidence.

In some implementations, images can be compared to sharing criteria and/or shared images can be determined, as described above, at various times and/or in response to one or more particular conditions of the first device (which, e.g., can be specified by the first user in some implementations). For example, in some implementations, images can be compared and determined for sharing upon capture by the first device, and/or upon the first device gaining access to or receiving the images; or upon one or more operating conditions of the first device (e.g., during, or not during, particular time periods in which particular device operations are being performed by the first device, e.g., such device operations as executing particular applications, sending or receiving data in a particular application, etc.).

In some implementations, a preview of images that qualify as shared images can be displayed, where the preview images are selected (e.g., by the system or device) from the image library of the first user based on the specified sharing criteria (e.g., on the first device), e.g., after one or more sharing criteria have been input by the first user (or based on sharing criteria specified in user preferences, etc.). The preview can include preview images from the first user's library, e.g., images that match one or more of the sharing criteria currently designated by the first user and which qualify to be shared to the recipient user.

In some implementations, a user interface displaying the preview can provide displayed interface elements or controls allowing the first user to remove one or more images from the sharing status prior to sharing the images with the second user (e.g., by selecting the images in the preview with user input, or by deselecting the images). In some implementations, all of the images that qualify as shared images can be displayed in the preview (e.g., as a scrollable list or grid of images having an order of images). In some implementations, a subset of representative images that qualify as shared images can be displayed in the preview, e.g., images that have below a threshold visual similarity to other images as determined by one or more image pixel-based similarity measurement techniques, images that have visual characteristics relative to particular thresholds (e.g., for clarity, noise, exposure, etc.). In some implementations, such a representative subset of images can be displayed first in the preview order of images, before other images in the order (e.g., that may duplicates of or have similar content to the representative images, e.g., over a threshold similarity using a pixel similarity measure).

In some implementations, a preview of images that currently qualify as shared images can be displayed for specific types of sharing criteria, e.g., in association with the first user selecting additional sharing criteria by selecting images from a list of images (e.g., blocks 212 and 214 can be iteratively performed multiple times). For example, the preview can be updated after each selection of an image that specifies one or more sharing criteria, such that only images that match the selected one or more sharing criteria are displayed in the preview.

In block 216, an invitation is sent to the second user. The invitation requests that the second user accept access to the images that the first user has shared. The invitation can be sent over the network to the second device associated with the second user.

In block 218, data indicating an acceptance of the sharing invitation is received from the second user and second device over the network. For example, a server system and/or the first device can receive the acceptance. If the second user declines the invitation for sharing (e.g., an indication of a decline is received in block 218), then performance of blocks 220-230 may be omitted.

In block 220, the second user is provided access to the shared images of the first user. For example, the second user can be granted permission(s) to access shared images of the first user's library of images, e.g., one or more stored collections or albums associated with and accessible by the first user. The stored collections can be stored on one or more servers, and/or on one or more client devices (including one or more client devices associated with the first user), etc.

In some implementations, access permissions associated with the shared images (e.g., permission status data) are automatically updated (without user input) to allow the second user to have access to the shared images, e.g., retrieve the data associated with the shared images for storing and/or displaying on a user device of the second user. For example, in some implementations, an access permission is updated for each shared image, and is based on a confidence level associated with the determination that the shared image matches one or more sharing criteria. For example, if the shared image depicts a person, the confidence level indicates an estimated confidence or probability that the depicted person matches a person sharing criterion.

In some implementations, the access permission is updated to permit access to the second user for a particular image if the confidence level of sharing criteria match meets a threshold confidence level. In some implementations, multiple confidence level thresholds can be used to determine different forms of access level updates. In some examples, if the confidence level of the match of a shared image to sharing criteria meets a first threshold, then the access permission is automatically updated without user input to allow access to the shared image by the second user. If the confidence level of the match meets a second threshold that indicates lesser confidence in the match than the first threshold, then the first device displays the shared image as available for selection by user input to the first device from the first user to update the access permission for the first image to grant access to the second user. This allows images having lower-confidence matches to sharing criteria to be shared with another user if the first user manually indicates that these images are to be shared.

In some implementations, server system 102 may store a respective image library for one or more users. For example, the image library may store images associated with a user (e.g., captured using a device associated with an account of the user, uploaded to the server by the user, etc.), images that are shared with the user, and permissions associated with images in the library, e.g., that specify one or more other users that are granted access to the images. In some implementations, the image library of a user may be organized as a plurality of albums, each album including one or more images. An image may be included in more than one album.

In some implementations, when the second user is granted access to shared images of the first user, the shared images are automatically added to the image library of the second user (e.g., an automatic save feature, e.g., as described with reference to FIG. 3). In some implementations, when the second user is granted access to shared images of the first user, the shared images are automatically added to a separate album within the image library of the second user that includes the images shared by the first user. In some implementations, a portion of the image library of a user may be synchronized, e.g., to one or more devices associated with a user account of the user, such that the images stored on the one or more devices are also stored in the portion of the image library, and vice-versa in some implementations.

In some examples, the image data of an image library is stored in storage of the second device, such that the image data of the shared images are stored at the second device. In some implementations, the image data of an image library is stored on a server. In some implementations, the image data of an image library is stored both on a server and one or more client devices, and/or partially on a server and partially on one or more client devices. The image data includes pixel values of the pixels of the images of the library (e.g., color values or other values such as luminance values, etc.). For example, a user device can store a data pointer pointing to an associated image of the library stored on the server. Thus, the user's library of images on the server is accessible by the user device by following such data pointers.

In some implementations, the first device of the first user can access the image data stored on a server using data pointers. If the second user is granted access to shared images of the first user's image library, the access permissions of the first user's shared images are updated to permit the second user (e.g., devices used by the second user) access to the shared images. In an example, one or more second data pointers are sent from the server to the second device of the second user over the network, where the second data pointers point to the shared images and allow the second user device to access the image data stored on the server for the shared images. In some implementations, the first data pointers for the first user and the second data pointers for the second user may be uniform resource locators (URLs). In some implementations, the data pointers for the first user and the second data pointers may be the same URL. In some implementations, the data pointers for the first user and the second data pointers may be different URLs that point to the same images. This allows a single copy of image data to be stored (e.g., on a server or other device) to save storage requirements of image data, where different user devices can retrieve the image data of the single copy to store or view the image data.

In block 222, a new image is obtained by the first device. This may occur at a time after the setup of sharing described above for blocks 208-220. For example, the first device may capture the new image from a camera component of the first device, may receive the new image from a device over the network, may generate the new image in an editing application, etc.

In block 224, the new image is programmatically analyzed to determine if there are any matches to the sharing criteria. For example, metadata of the new image can be examined and compared to appropriate sharing criteria. In some examples, timestamps indicating date of image capture, image creation, image modification, etc., can be compared to time criteria described above to determine if the new image qualifies as a shared image. Location metadata of the new image can be analyzed to determine if the new image qualifies as a shared image. Image content can be analyzed for image features that meet image feature criteria.

In block 226, it is checked whether one or more matches were determined for the new image in block 224. If not, then the method continues to block 228, in which the second user is not provided access to the new image (e.g., as determined for method 200; the second user can be granted access to the new image in other ways, such as via specific input from the first user). If one or more matches to sharing criteria were determined for the new image, then the method continues to block 230, in which the second user is provided access to the new image, similarly as the access provided in block 220. Multiple new images obtained by the first user or first device can be similarly processed if sharing criteria are met.

In some implementations, content items (e.g., content data) other than images can be shared according to methods and implementations described herein, similarly to the images described herein. For example, content items can include audio data or audio data segments (e.g., voice, music, etc.) without accompanying or corresponding images. In some implementations, if user consent has been obtained, voice recognition techniques can be used to detect or identify a speaker user whose voice is captured in voice audio data, and apply sharing criteria based on the detected user. In another example, types of sound effects can be detected (e.g., water flowing, sounds of bells, birds or other animals, etc.) and sharing criteria can be applied based on the detected types to determine if the sound data qualifies for sharing. In another example, content items can include documents, such as text documents or documents including text and images, where topics or subject matter of the documents can be programmatically analyzed for keywords or keyphrases or based on machine learning techniques to determine if the documents match sharing criteria for text and thus if the documents qualify as shared content items.

In some implementations, the first user can set up and enable the sharing of images described in method 200 with a single other user (the recipient user) and, while this sharing is enabled, the first user cannot additionally provide access to other users for the shared images using method 200. In some examples, the first user can cancel the sharing of images with the second user and set up sharing of images with a different user. In some implementations, multiple recipient users can be provided access simultaneously to shared images of the first user using method 200. For example, the sharing criteria can be applied as described above and the multiple users each provided access to the shared images.

In some implementations, different and independent sets of sharing criteria can be associated with each of multiple recipient users. A set of sharing criteria associated with a particular recipient user is applied to the sending user's images for the sharing of images to that particular recipient user, and this is repeated for each of multiple designated recipient users. For example, sharing criteria can be different for each such recipient user (e.g., an option to include at least one different sharing criterion for each recipient user, if selected by the first user). For example, the first user can specify one set of sharing criteria to share only images depicting babies with a grandparent recipient user, a different set of sharing criteria to share only images depicting faces of a friend captured in 2013 or later with that friend recipient user, and a third set of sharing criteria to share all images captured at a home location with a spouse recipient user.

In some implementations, sending a sharing request and/or shared images to other devices (e.g., user devices) as described for FIG. 2 can be enabled and/or disabled temporarily, e.g., based on whether one or more particular conditions apply. For example, the first device can be enabled to send invitations for sharing and/or shared images to other user devices (such as the second device) at particular times, and can be disabled to send such invitations and/or shared images at other times. In some implementations, the particular conditions can be specified in stored first user preferences. In some implementations, the particular conditions can include one or more events that are detected to have occurred. For example, the first device may have sharing disallowed and then the first device is carried or moved to a particular geographical location (e.g., as specified in stored preferences), such as a specified geographical area, that allows sending invitations and sharing of images to the other user devices. In some examples, the sharing is continued to be allowed while the first device is located at that location, or can have a time duration specified in preferences or settings starting from the time when the first device first entered the location, such that the sharing is disabled after the time duration expires.

In some implementations, a control (e.g., button or weblink) is displayed on the first device, and if the control is selected by first user input, the first device is enabled to share images to other devices as in FIG. 2 (e.g., for a particular time duration and/or while at a particular location). For example, a particular Uniform Resource Link (URL) can be specified in the weblink, to which the first device can connect over the network to send sharing invitations and shared images. In some implementations, the second device can be made temporarily available to send invitations and/or shared images to other devices, e.g., similarly to the first device as described above.

In some implementations, if no connection to an intermediate sharing device (e.g., server) is available (e.g., no wireless service is available at a particular location or under particular environmental conditions), then an alternative communication channel between the first device and second device can be established for shared images. For example, a peer-to-peer network connection (e.g., Bluetooth®, Wi-Fi Direct, etc.) can be established and used to transmit sharing invitations and images between the first device and second device. In some implementations, a different network link can be available and can be used.

In some implementations, one or more users and/or user devices (e.g., the second user or second user device in the example of FIG. 2) can be designated by the first user and/or first device as temporary sharing users or partners (and/or temporary sharing user devices) for shared images using the method of FIG. 2. For example, a sharing invitation and shared images can be sent to the temporary sharing partner (e.g., the second device and/or a second user server account) if one or more particular conditions are met as determined by the first device, e.g., if the current time is within a particular time period. The particular conditions can be specified in stored user preferences or first device settings. For example, the particular conditions can include specified time period(s), specified geographic location(s) of the first device and/or the second device, current usage by the user of specific applications on the first device and/or the second device, etc.

In some implementations, a sharing user may be allowed access to the shared images of the first user initially, as described in FIG. 2, and then blocked from access to the shared images of the first user after a particular time period expires and/or other condition occurs. In some implementations, user devices may be allowed to share images with each other (e.g., give each other access to the shared images of the other user) while the users are co-located at a particular geographic location, e.g., the user devices are within a particular threshold distance of each other. In some implementations, user devices maybe allowed to share images with each other while the users of those devices are participating in a shared conversation group or chat, e.g., in a messaging application running on all the user devices.

In some implementations, one or more users and/or user devices can be designated as ongoing sharing users or partners, e.g., for which there are no conditions that impose temporary sharing access for the first user's sharing invitations and shared images.

Figure 3:
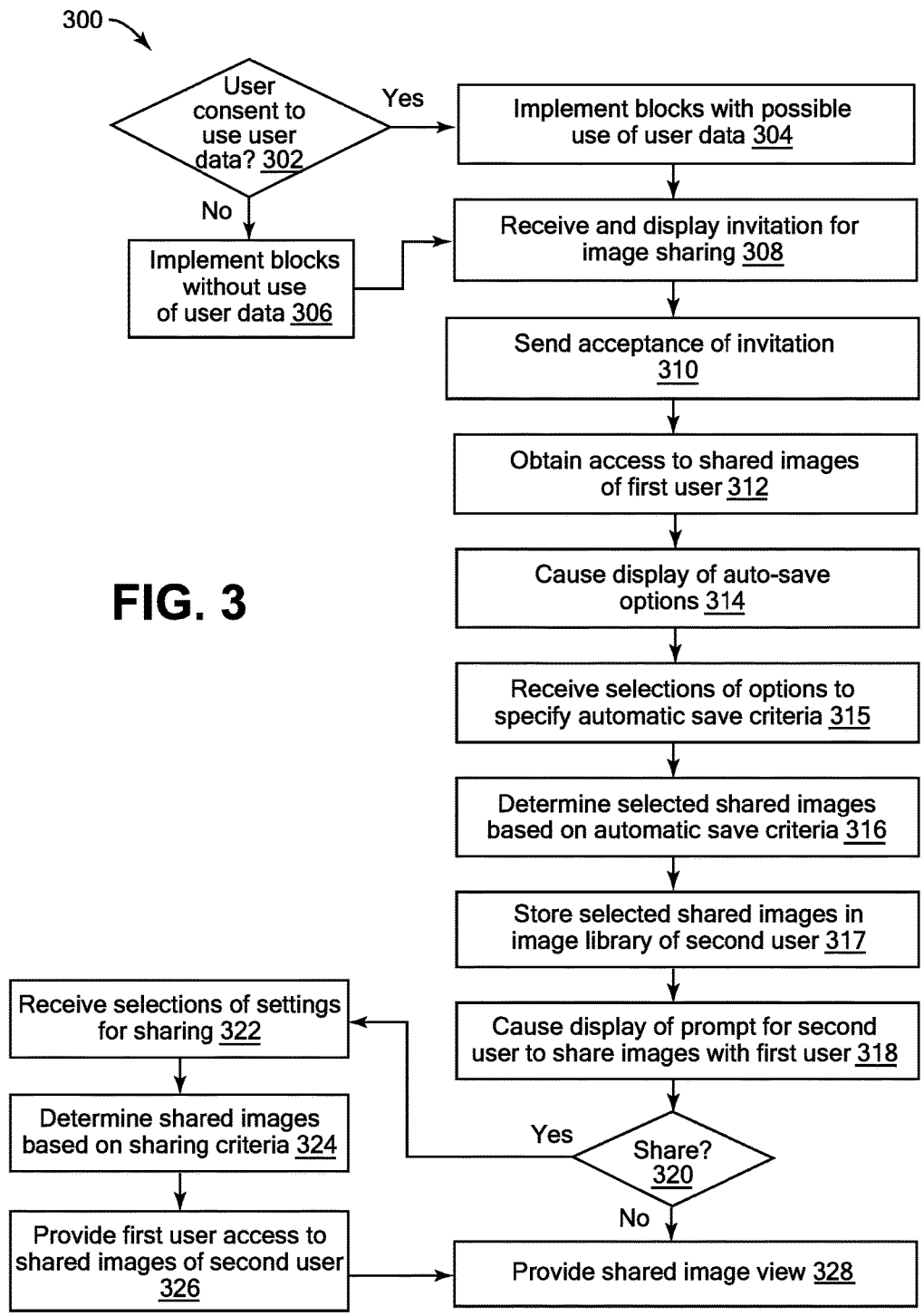
FIG. 3 is a flow diagram illustrating an example a method to provide features to share images for a recipient user, according to some implementations.

FIG. 3 is a flow diagram illustrating an example a method 300 to provide features to share images for a recipient user, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In some implementations, the implementing system includes one or more digital processors or processing circuitry ("processors"), and one or more storage devices (e.g., a database 106 or other storage). In some implementations, different components of one or more servers and/or clients can perform different blocks or other parts of the method 300. In some implementations, a second device is described as performing blocks of method 300. Some implementations can have one or more blocks of method 300 performed by one or more other devices (e.g., other client devices or server devices) that can send results or data to the second device. The various examples and implementations described for method 300 can be combined in various permutations or combinations.

In some implementations, the method 300, or portions of the method, can be initiated automatically by a system. In some implementations, the implementing system is a second device. In some implementations, the method (or portions thereof) can be periodically performed, or performed based on one or more particular events or conditions, e.g., an application being initiated by a user, receiving one or more images that have been newly uploaded to or accessible by the system, a predetermined time period having expired since the last performance of method 300, and/or one or more other conditions occurring which can be specified in settings read by the method. In some implementations, such conditions can be specified by a user in stored custom preferences of the user.

In some implementations, the second device can be a camera, cell phone, smartphone, tablet computer, wearable device, or other client device that can receive content input (e.g., image capture) by a user to the client device, and can perform the method 300. In some implementations, a client device or server device can receive one or more images uploaded from one or more users or received over a network connection, and can perform the method 300 for the one or more images. In some implementations, a client device can send an image to a server over a network, and the server can process the content using method 300. Some implementations can initiate method 300 based on user input. A user (e.g., operator or end-user) may, for example, have selected the initiation of the method 300 from a displayed user interface, e.g., application user interface or other user interface.

In block 302, it is checked whether user consent (e.g., user permission) has been obtained to use user data in the implementation of method 300. User data can include messages sent or received by a user, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 300, then in block 304, it is determined that the blocks of the methods herein can be implemented with possible use of user data as described for those blocks, and the method continues to block 308. If user consent has not been obtained, it is determined in block 306 that blocks are to be implemented without use of user data, and the method continues to block 308. In some implementations, if user consent has not been obtained, blocks are to be implemented without use of user data and/or generic or publicly-accessible and publicly-usable data.

In block 308, an invitation for shared images is received at the second device and the invitation is output by the second device. In some implementations, the invitation can be from the first device (and first user) as described in block 216 of FIG. 2, to obtain access to shared images of the first user. In some implementations, the invitation can be displayed in a user interface, output as audio from speakers, etc.

The invitation for shared images can be received and output if the second user and/or second device have not previously accepted a sharing connection with the first user and/or first device, e.g., if the second user and/or second device have not been previously granted access to the shared images as described in FIG. 2. If a sharing connection to the shared images of the first user were previously accepted by the second user and/or second device, and an indication of granted access permission to the shared images of the first user was previously received by the second user and/or second device, then the display of the invitation is omitted and shared images can be automatically saved to the second user image library based on automatic save criteria as described herein, e.g., in blocks 314-317 below. In some implementations, if there is such an existing sharing connection, then the invitation is not received by the second device.

In block 310, an acceptance of the invitation is received by the second device as input by the second user, and the acceptance is sent to the first user, e.g., the acceptance is sent so that it is received by the first device over the network. In some examples, the acceptance can include user input provided to a user interface displayed by the second device, e.g., selecting a displayed accept button, etc.

In block 312, access to the shared images of the first user is obtained for the second user. For example, the second user (e.g., the second device and/or an account of the second user) can receive an indication that access permission to the shared images of the first user has been granted to the second user. In some implementations, the second user and/or second device can be provided with access permission data needed to access the shared images associated with the first user (as determined with respect to method 200 of FIG. 2). The permissions (e.g., permission data) can be stored on one or more server devices, client devices, etc. The second device is thus able to receive image data of the shared images and/or display the shared images of the first user on its display. The access can be provided in response to the first user sharing these images as described with respect to method 200 of FIG. 2.

In block 314, auto-save options can be displayed by the second device, where the auto-save options provide settings to allow the second user to designate automatic save criteria that define which of the shared images of the first user are to be saved automatically in storage associated with the second user. The storage of the second user can be storage provided on one or more servers, provided on one or more client devices (e.g., the second device), provided in part on server and in part on one or more client devices, etc. For example, if the second user's storage includes one or more client devices, shared images stored on a server can be downloaded to those client devices over the network. The storage of the second user can include a library of images associated with the second user.

The auto-save options can be displayed in response to the second user providing an acceptance to the invitation for sharing received in block 308. In some implementations, the auto-save options can be displayed at any time by the second device based on user input, e.g., to add or change automatic save criteria as user preferences or device settings.

The automatic save criteria can be specified in a variety of ways to indicate which shared images are to be automatically saved to the second user's storage. In some implementations, one or more of the automatic save criteria can be similar to, and can be specified similarly to, the sharing criteria described herein, e.g., for block 212 of FIG. 2.

In some implementations, a second user can specify image feature criteria for the automatic saving, in which specified visual image content (e.g., image features) are to match visual content in a particular image to qualify that particular image for automatic saving to the second user's image library. In some implementations, the second user can specify image feature criteria by identifying persons, types of features, etc. In some implementations, images from the second user's library of images can be displayed in a user interface (e.g., on the second device) and the second user can select a displayed image to identify one or more image features in that image as automatic save criteria. For example, this allows the second user to select persons known to the second user via the second user's image library as automatic save criteria.

In some implementations, images from the second user's library can depict faces of different, unique persons. Duplicative images having visual content duplicating or similar to other images in the library can be omitted from the display in this user interface, such that the user interface displays images depicting unique persons that are not duplicated in all the images displayed in the user interface. When the second user selects a particular one of those images, this selection specifies an automatic save criterion (e.g., person save criteria) such that shared images that depict that person (e.g., as determined based on face recognition techniques, if user consent has been obtained) qualify for automatic saving to the second user's library. A person identifier can be determined that indicates a particular person depicted in the selected image, and this person identifier can be designated as a person save criterion, similarly as described for FIG. 2. In some implementations, a person save criterion can be a face save criterion that specifies a particular face identity, e.g., based on a face model or a face model cluster as described herein.

In some implementations, the user interface for specifying automatic save criteria can display shared images of the first user to which the second user has previously been given access, in addition or alternatively to displaying images from the second user's library, and the user can select one or more of such shared images as automatic save criteria.

In some implementations, models of objects, such as face models for faces, are accessible to the second user device and can be specified as automatic save criteria. In some implementations, face models similar to those described above for block 212 of FIG. 2 can be used in block 314. This allows a system to detect various faces in different images and match those faces to save criteria face models to determine that the depicted faces belong to the particular persons associated with the face models and thus are to be saved in the second user image library. In some implementations, such face models can be stored locally to the second user device, and can be generated based on detected faces depicted in the images stored in the second user image library. In some implementations, face models can be stored additionally or alternatively on network storage and/or a server accessible by the second device over a network, and such face models can also be used as image criteria. In some implementations, face models are maintained only in local storage of user devices and are not transmitted to servers over the network. In some implementations, face model clusters are provided, where each cluster represents a particular person and includes multiple face models that have been determined based on depicted faces in image and/or confirmed via user input to represent the particular person.

In some implementations, one or more images can be displayed, e.g., by the second device, as "save criteria images" having characteristics that can be indicated to be automatic save criteria. For example, user input from the second user can select at least one of the save criteria images to specify automatic save criteria. Save criteria images can be selected in other ways, e.g., selected by the system based on stored user preferences and/or based on characteristics similar to other save criteria images (e.g., having a time of capture or location of capture within a particular period of time or geographic distance of the times and locations associated with one or more other save criteria images, having the same type of image content features as in other save criteria images, etc.), etc. In some implementations, such save criteria images can display image content that is used as automatic save criteria as described above, if the save criteria image is selected by first user input. For example, such save criteria images can be images provided by the system from the second user image library.

Such automatic save criteria can include image content feature criteria. For example, save criteria images can depict sample faces from different persons (or face/object models) depicted in the second user's library images. In some examples, a save criteria image for a particular person can be displayed, which, if selected by the user, selects the corresponding person identifier as an automatic save criterion. In some implementations, the person identifier is stored on the second device (e.g., determined from a face model or face model cluster) and was created based on the image library of the second user.

In some implementations, one or more save criteria images can be displayed by the second device which correspond to one or more corresponding particular identifications (e.g., person identifiers) from the first user and/or first user device that were, e.g., created based on the first user's image library (e.g., based on face model(s) determined from images of the first user) or otherwise identified by the first device. Such identifications can be received by the second device, e.g., from the first user and/or first device. For example, the second device may not yet store any person identifiers corresponding to a person depicted in a shared image, and the corresponding person identifier from the first user can be used to represent that person for a save criteria image. This can allow the second user to select content features as automatic save criteria which have been identified by the first user and/or first device.

In some implementations, save criteria images can depict content types that were previously selected or viewed by the second user and/or match stored preferences or settings set by the second user. In some implementations, such save criteria images can be obtained from lists storing the most viewed or downloaded images by multiple users, from a network site that is accessed by the multiple users.

Duplicative save criteria images, e.g., that depict content that is duplicative to other save criteria images, can be omitted from display, similarly as described above. In some implementations, for save criteria images depicting persons, each of the save criteria images can be selected for display by the system to depict a different, unique person and be associated with a different person identifier. In another example, each of the save criteria images can be selected from a different cluster of images, where each cluster of images is associated with a different, unique person and each cluster of images includes one or more images depicting an associated unique person. In some implementations, the clusters can correspond to face model clusters as described herein.

Similarly, save criteria images can be displayed that depict image features other than faces, e.g., a sunset, a landscape, a building, an animal, etc., which the user can select to indicate save criteria based on one or more of the depicted image features. Save criteria images can be cropped portions of images from the second user's library of images, and/or can be modified versions of such images, similarly as described above for sharing criteria images for FIG. 2.

In some implementations, automatic save criteria are determined from particular image features in a save criteria image, where those image features have predetermined or specified characteristics, and automatic save criteria are not determined from other image features depicted in the save criteria image that do not have such characteristics. In some implementations, the specified characteristics used for automatic save criteria can be specified or indicated by user input, user preferences, device settings, etc. Particular types of image features can specify save criteria, such as faces, animal types, landscape features, etc. In some implementations, image features having a characteristic such as a threshold size or greater size, overlapping and/or have pixels (or center) located within a particular threshold distance of the center of the image (or other particular location within the image area or frame), specified colors, brightness, or other characteristics can be used as automatic save criteria, while other features not having such characteristics are not used as automatic save criteria, e.g., similarly as described above for sharing criteria.

In some implementations, an image that has been shared to the second user device and stored in the second user image library can be provided as a save criteria image to allow its characteristics to be specified as automatic save criteria. In some implementations, a face model can be generated from a face depicted in a received image, and the face presented as automatic save criteria that will allow further received shared images that depict faces that match the face model to be automatically saved in the second user image library.

The second user can specify other automatic save criteria to qualify shared images for saving, e.g., time criteria, location criteria, and other criteria similar to sharing criteria as described herein.

In block 315, selections of displayed auto-save options can be received from the second user, including user input received by the second user device that specifies automatic save criteria. The automatic save criteria indicate which of the shared images are to be stored in storage associated with the second user. Automatic save criteria can be received from the second user in other types of interfaces or user input in some implementations.

In block 316, selected shared images are determined from the shared images of the first user based on the automatic save criteria. These are shared images of the first user that have been selected to be saved in the second user image library, e.g. a subset of the shared images if not all of the shared images are selected. In some implementations, the shared images of the first user can be filtered based on the automatic save criteria. In some implementations, the shared images and/or information associated with the shared images can be processed to determine which shared images match the automatic save criteria of the second user.

In some implementations, the filtering and/or selection of block 316 is performed by the second user device. In some implementations, the filtering and/or selection of block 316 can be performed partially or completely by a server device in communication with the second user device. Automatic save criteria can be stored in local storage of the second device, and/or the selected shared images can be determined by the second device. In some implementations, one or more automatic save criteria can be stored at a server (or other device) remote from the second device (e.g., connectable to the second device over a network), and/or the server (or other device) can determine the selected shared images. In some implementations, both the second device and one or more remote devices store automatic save criteria and/or determine the selected shared images.

In some implementations, the shared images can be programmatically analyzed to determine which shared images depict persons that match the person identifiers of the automatic save criteria of the second user (if user consent has been obtained). In some implementations, the programmatic analyzing can include detecting image content features as described herein. In some implementations, the programmatic analyzing can include obtaining metadata of the shared images such as timestamps indicating time of capture of the shared images and/or location information indicating location of capture of the shared images.

In some implementations, the receiving device (e.g., second device) can determine identifications of one or more content features in the shared images. In some implementations, the identifications can be person identifiers determined based on matching to face models derived from images from the image library of the second user, similarly as described above (e.g., local face models, and/or server-stored face models). In some implementations, a server can be used for determining content identifications (e.g., person identifiers) for the shared images. In some implementations, the second device (and/or a second user server account) receives associated information for the shared images, e.g., identification information indicating one or more identifications of one or more image content features depicted in an associated shared image. In some implementations, the identifications can include person identifiers received by the second device. In some implementations, the identifications (e.g., person identifiers) were determined for sharing of the shared images by the first user and/or first device (e.g., the images were programmatically analyzed to identify image content features to determine the person identifiers, as described for FIG. 2, and/or person identifiers were manually input by the first user, etc.). In some implementations, such received person identifiers (associated with shared images) can be compared with person identifiers associated with the automatic save criteria of the second user, to determine if matches exist.

In some implementations, a confidence level can be determined for a match between a shared image and the automatic save criteria (e.g., between each shared image and each automatic save criterion). If the confidence level meets a first confidence level threshold, then the shared image can be automatically considered a selected shared image. In some implementations, if the confidence level of a match meets a second confidence level threshold that indicates a lesser confidence than the first confidence level threshold, then the shared image can be displayed in a user interface of the second device which allows user input from the second user to select whether the shared image is to be saved in the second user's image library.

In some implementations, the second user can also or alternatively manually browse the shared images of the first user, or a subset of the shared images of the first user, as displayed in a user interface, to select which of these images to save to the image library of the second user. In some implementations, such displayed shared images can be images that meet a lower confidence threshold as described above, and/or shared images that have other predetermined characteristics (e.g., particular image content types, time of capture, location of capture, etc.). In some implementations, a preview of the shared images can be displayed on the second user device and particular images of the shared images can be selected by user input received by the second user device from the second user. In some implementations, the preview of the shared images can omit images from display that have been "unshared" (e.g., sharing has been revoked) as described above, based on user input from the first user that was received by the first user device after the shared images were shared by the first user.

In block 317, the selected shared images determined in block 316 (e.g., the shared images that meet the automatic save criteria of the second user) are stored in the library of images of the second user. In some implementations, image data of the selected shared images is stored in storage accessible to the second device or the second user, e.g., local storage and/or network storage. In some implementations, data pointers are stored in the second user's image library, the data pointers pointing to the image data of the selected shared images that is stored on a different device. In some implementations, data pointers can be stored at the second device, which allows the second device to retrieve and display the image data of the selected shared images.

In some implementations, the selected shared images can be automatically altered by the system performing the storage. In some implementations, the selected shared images can be degraded to a particular resolution and/or quality and stored in the altered form. For example, in some implementations, the system can examine stored user preferences that were specified by the user previous to method 300 and/or previous to block 314 and/or block 316, and can alter the resolution of the shared images (e.g., create shared image copies having the resolution) based on the user-specified preferences. In some implementations, the second user's library of images can be associated with settings that indicate storage settings for the images (e.g., settings to downsample images to a resolution specified by the associated settings).

In block 318, in some implementations, a prompt is displayed by the second device requesting whether the second user would like to share images of the second user with the first user. In some implementations, the prompt can ask whether the second user would like to provide access of any of the second user's images to the first user (e.g., first device). In some implementations, a prompt to share images of the second user only to the first user is provided (who sent the invitation and shared images received in FIG. 3), e.g., a "reciprocate" type of option, and prompts to share images with other users are not provided. Other implementations can provide prompts to share images with one or more other users, e.g., users socially connected to the second user and/or to the first user as determined as described herein, if user consent has been obtained.

In block 320, it is determined whether the second user has indicated to share one or more images of the second user with the first user. In some implementations, this can be determined based on a selection of the second user for the prompt of block 318, or by other user input from the second user to share images. If no sharing is indicated, the method continues to block 326, described below. If the second user has indicated to share images, the method continues to block 322, in which selections are received from the second user to specify settings for sharing. In some implementations, various sharing criteria, delay period, and/or other sharing settings can be specified by the second user similarly to the sharing settings specified by the first user and obtained in block 212 of FIG. 2. The method continues to block 324.

In block 324, the shared images for the second user are determined based on sharing criteria specified by the second user, e.g., in block 322. In some implementations, images are programmatically analyzed by the second device and/or other devices in communication with the second device, based on the sharing criteria, to determine which images qualify as shared images. The images analyzed may be stored in an image library, e.g., that includes one or more stored collections or albums, associated with the second user, e.g., stored on one or more servers, stored in local storage of the second device or other client devices accessible to the second user, etc. Images determined to qualify as shared images can be designated as images to be shared with the first user (sending user), e.g., a respective designation associated with each shared image and stored in device storage.

In block 326, the first user is provided access to the shared images of the second user. In some implementations, the first user can be granted permissions to access the shared images of the library of images (e.g., one or more stored image collections or albums) associated with and accessible by the second user. In some implementations, an access permission associated with each shared image of the second user can be updated to allow access by the first user and/or first device to that shared image. In some implementations, this can be similar to granting access of the first user's shared images to the second user as described above for block 220 of FIG. 2. The stored collections can be stored on one or more servers, on one or more client devices associated with the second user, etc. The method continues to block 328.

In addition, new images obtained by the second user (e.g., second device) can be analyzed for matches to the second user's sharing criteria and shared with the first user if appropriate, similarly to new images obtained by the first user being shared with the second user as described for blocks 222-230 of FIG. 2.

In some implementations, block 328 can be performed at any time on the second device after the second user has received access to the shared images of the first user. A shared image view can be provided, e.g., in response to the second user providing user input to the second device to display this view. The shared image view displays the first user's shared images without displaying images of the second user. In some implementations, the shared image view can be in a user interface that is visually distinguished from a visual interface used to display the images of the second user (e.g., displayed in a different window, color, shape, visual texture, different headings, etc.). In some implementations, the shared image view can be a separate view from a second user image view that can be accessed by the second user to display the second user's images without displaying the shared images of the first user. Displays of the shared image view and second user image view can be toggled on the display screen of the second device, in some implementations.

In some examples, the first user's shared images can be presented chronologically by time/date of capture of the images, and/or can be sorted by the time/date that the image was shared with the second user, e.g., the time/date at which the second user obtained access to the image.

In some implementations, reciprocal sharing exists in which the second user has shared images of the second user with the first user in addition to having access to shared images of the first user. In some implementations where reciprocal sharing exists, the shared image view of the second user does not display images that the first user received access to via sharing from the second user.

Similarly, a similar shared image view can be provided on the first device for the first user to view shared images of the second user, if the second user has provided access of the second user's shared images to the first user.

In some implementations, notifications can be periodically provided on a recipient device (e.g., second device) to indicate that one or more images have been newly-shared and automatically stored in the image library of the second user, and are available for viewing (e.g., the notification can provide a link or button to display the newly-shared images). In some implementations, the notification can be displayed periodically or in response to a device state of the second device (e.g., power on, screen turned on, running or accessing a particular application, etc.). In some implementations, notification conditions can be specified in stored user preferences. In some implementations, after the user has selected to view shared images, a notification is no longer provided for those images.

In some implementations, the ability to receive a sharing request and/or shared images by the second device as described for FIG. 3 can be made temporarily available and/or unavailable, e.g., based on whether one or more particular conditions apply. In some implementations the second device can be made available to receive invitations for sharing and/or shared images at particular times, and can be made not available for such invitations and/or shared images at other times. In some implementations, the first device can query the second device to determine whether it is available to receive a sharing invitation and shared images from the first device. In some implementations, the particular conditions can be specified in associated stored user preferences. In some implementations, the particular conditions can include one or more events that are detected to have occurred. In some implementations, the second device may have sharing disallowed and then is moved to a particular geographical location (e.g., as specified in stored preferences), such as a specified geographical area, that allows receiving shared images as in FIG. 3. In some implementations, the sharing is continuously allowed while the second device is located at that location, or the sharing can have a time duration specified in preferences or settings, starting from the time when the second device first entered the location such that the sharing is disallowed after the time duration expires. In some implementations, a control or weblink is displayed on the second device, and if the control is selected by second user input, the second device is made available for the sharing of images as in FIG. 3 (e.g., for a particular time duration and/or while at a particular location). In some implementations, a particular URL can be specified in the weblink, to which the second device can connect to receive sharing invitations and shared images (e.g., shared images that are new to the second device since the last time the second device received shared images). In some implementations, the first device can similarly or correspondingly be made temporarily available to receive invitations and/or shared images from the second device.

In some implementations, if no connection to a sharing server is available (e.g., no wireless service is available at a particular location or under particular environmental conditions), then an alternative communication channel between the first device and second device can be established for shared images. In some implementations, a peer-to-peer network connection (e.g., Bluetooth®, Wi-Fi Direct, etc.) can be established and used to transmit sharing invitations and images between the first device and second device. In some implementations, a different network link can be available and can be used.

In some implementations, one or more users or user devices (e.g., the first user or first user device in the example of FIG. 3) can be designated by the second user and/or second device as temporary sharing users or partners (and/or temporary sharing user devices) for shared images as described for FIG. 3. In some implementations, shared images from the temporary sharing partner can be received by the second device (and/or by a second user server account) and stored in the second user image library if one or more particular conditions are met as determined by the second device, e.g., if the images are received in particular time periods. The particular conditions can be specified in stored user preferences or second device settings. In some implementations, one or more users and/or user devices can be designated as an ongoing sharing user or partner, e.g., for which there are no conditions that impose temporary sharing access for those users and devices to the second user image library.

Figure 4:
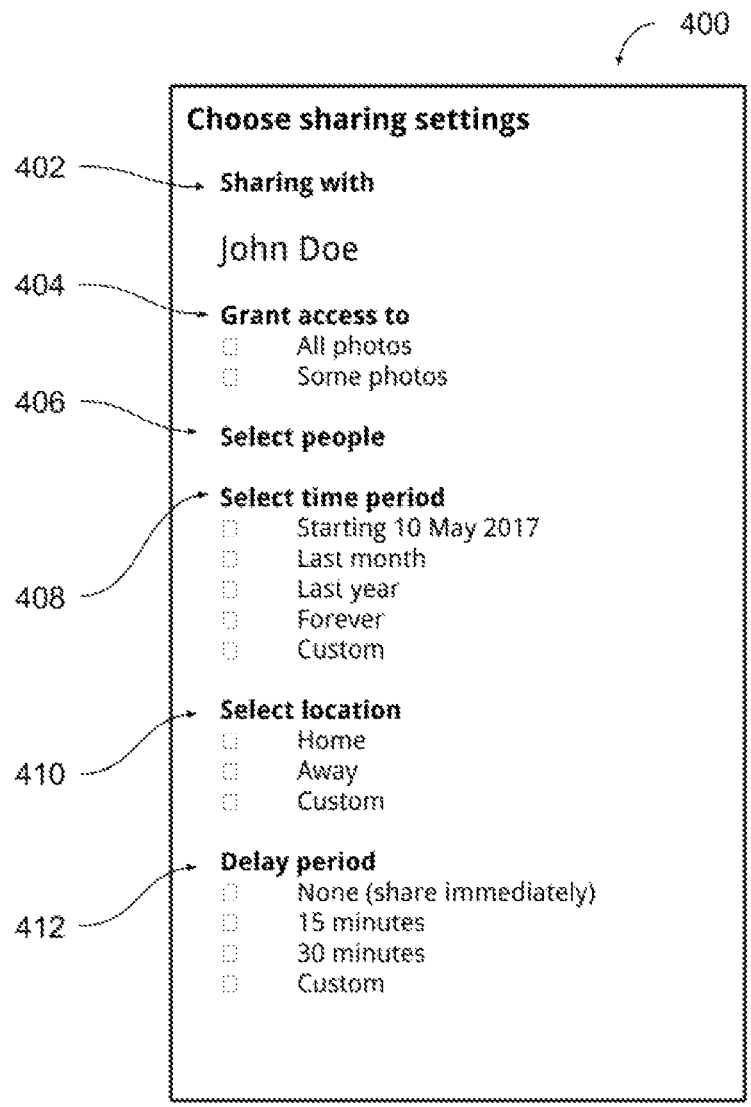
FIG. 4 is a diagrammatic illustration of an example user interface, according to some implementations.

FIG. 4 is a diagrammatic illustration of an example user interface 400, according to some implementations. In some implementations, user interface 400 (and other user interfaces described herein) can be displayed on a display (e.g., display screen) of a user device, such as the first device or second device described herein. As illustrated in FIG. 4, user interface 400 permits a sending user (e.g., first user) to choose sharing settings, including specifying one or more sharing criteria. User interface element 402 indicates that the sending user is sharing with a second user (recipient user) identified as "John Doe." In some implementations, sharing with the second user may utilize one or more identifiers associated with John Doe, such as an e-mail address, a social media username, an identifier for an image sharing application, a phone number, etc.

User interface element 404 provides the sending user with options to grant access to the second user to all or some of the images (e.g., photos) of the sending user. In some implementations, if the sending user selects "All photos," entire contents of the image library of the sending user may be shared with the second user. In another example, if the sending user selects "Some photos," the sending user can specify one or more sharing criteria.

Figure 5:
FIG. 5 is a diagrammatic illustration of another example user interface, according to some implementations.

In some implementations, the one or more sharing criteria may include image feature criteria that are people criteria, e.g., based on people depicted in images in the image library of the sending user. As illustrated in FIG. 4, user interface 400 may include a user interface element 406 that enables the sending user to indicate a selection of one or more people that are depicted in images in the image library to share with the second user. In response to the sending user activating user interface element 406, the sending user may be presented with another user interface on the sending user's device for the user to indicate such selection. An example of such a user interface is illustrated in FIG. 5.

In some implementations, the one or more sharing criteria may include time criteria for the images. In some implementations, the sending user may specify any time period, e.g., a particular day, a start day and/or an end day, etc. In some implementations, user interface 400 includes user interface element 408 that enables the sending user to indicate the time criteria. As illustrated in FIG. 4, the sending user may indicate a start date ("Starting 10 May 2017"), a particular time period ("Last month," "Last year," "Forever"), or specify custom time criteria ("Custom"), e.g., a particular upcoming/future day, week, etc.; the next day or other specified time period (as measured from the current time); other user-specified time range, etc. In some implementations, one or more time criteria options can be displayed as events, e.g., based on user data if user consent has been obtained (e.g., a user's calendar, user's task list, etc.). In some implementations, a criteria option of "Spring Vacation" can specify time criteria that is the time period of this event as indicated by user data or other referenced data (standard calendar, etc.). In some implementations, one or more timestamps, e.g., a creation date, a last modified date, an upload date, etc. associated with images in the image library of the sending user may be compared with the time criteria to identify images that are to be shared to the second user.

In some implementations, the one or more sharing criteria may include location criteria for the images. In some implementations, the sending user may specify a specific location, a geographic region (e.g., a city, a state), etc. In some implementations, user interface 400 includes user interface element 410 that enables the sending user to indicate the location criteria. As illustrated in FIG. 4, the sending user may indicate one or more particular locations as labels or categories ("Home," "Away") or specify custom location criteria ("Custom"). In some implementations, when users provide permission, location data associated with images in the image library of the sending user may be compared with the location criteria to identify images that are to be shared to the second user. In some implementations, location data may include location metadata for the image, e.g., included by a capturing device that includes location features (e.g., GPS). In some implementations, location data may be determined, e.g., based on one or more landmarks recognized in the images.

In some implementations, any combination of people criteria, time criteria, and location criteria may be used as sharing criteria. For example, user interface 400 may enable the sending user to specify a particular time period (e.g., "last month"), a location (e.g., "San Francisco"), and select people (e.g., "John," "Tim," "Jane," etc.). In response to the sending user indicating the selection, images in the image library of the sending user that match all of the sharing criteria are shared with the second user. In some implementations, one or more of the sharing criteria may be optional, e.g., the user may specify people criteria, but not specify any time criteria or location criteria. In these implementations, images in the image library of the sending user that match the people criteria are shared with the user.

While FIG. 4 illustrates people criteria, time criteria, and location criteria, the sending user may specify one or more other criteria for sharing. In some implementations, the sending user may specify image quality criteria (e.g., visual quality criteria) to share images. For example, in some implementations, the image library may store user-assigned quality ratings (user ratings) for images, e.g., 1-star, 2-star, 5-star, etc. In these implementations, the sending user may specify sharing criteria such as "Share images that are 4-star and above."

In some implementations, a sharing application that implements methods described with reference to FIG. 2 may automatically detect visual characteristics of images in the image library, e.g., based on programmatically analyzing the images, to assign a quality rating. The quality rating of an image can be a visual quality rating based on one or more visual image characteristics. For example, based on user permission to perform such analysis, programmatically analyzing the image may be based on determining one or more factors/characteristics such as illumination, focus, color noise, position (with respect to image area) and/or orientation of a face or other feature in the image, an expression on the face, blurriness, etc. The quality rating may be determined as a composite rating based on these factors. In some implementations, programmatically analyzing the image may include analyzing the image using a machine-learning application that includes an inference engine that provides a quality rating (e.g., "High," "Medium," and "Low") for an image based on applying a trained model.

In some implementations, the sending user may specify that duplicates or near-duplicates, e.g., images that depict similar subject matter are to be excluded from sharing (e.g., where similarity can be determined based on image pixel similarity techniques). In these implementations, such images may be identified based on programmatically analyzing images in the image library, and may be excluded from the images shared with the second user. In some implementations, the sharing criteria may specify that certain types of images are to be excluded from sharing, e.g., even when the sending user has selected "All photos" in user interface 400. In some implementations, the sending user may specify that images that do not depict any persons (e.g., images that depict documents, receipts, animals, trees, food, etc.) are to be excluded from sharing. In these implementations, such images are excluded, e.g., based on programmatically analyzing the images to determine that the images do not depict one or more persons. In some implementations, one or more other sharing criteria can include whether the sending user has posted the image to a network service for display by other users, e.g., users having a social connection to the sending user (e.g., social networking service, image collection service, etc.). In some implementations, if the sending user has posted the image to such a service, then the image can qualify as a shared image for the recipient user.

FIG. 5 is a diagrammatic illustration of an example user interface 500, according to some implementations. As illustrated in FIG. 5, images 502-518 are displayed, e.g., as an image grid, in user interface 500. Each image in the image grid corresponds to a particular person that is depicted in one or more images in the image library of the sending user. In some implementations, when the sending user consents to analysis of images in the image library, facial matching techniques can be applied to images in the image library of the sending user to identify images that depict particular faces. Each image that is detected as depicting a particular person based on facial matching techniques may be grouped into a person cluster (or face cluster) corresponding to the particular person. In some implementations, such grouping may include adding metadata to the images that identify one or more person clusters for the image.

As shown in the example of FIG. 5, images 502-518 each correspond to a different person and no persons are depicted in two or more of the images. In some implementations, each image displayed in the user interface 500 can show a different, unique group of persons, e.g., each displayed image depicts a different number of persons and/or at least one different person than the other displayed images. The image library of the sending user may include one or more images of each different person shown in images 502-518. User interface 500 enables the sending user to indicate selection of one or more persons, e.g., by selecting a corresponding image from images 502-518. In the example illustrated in FIG. 5, the sending user has selected persons corresponding to images 514 and 516, as indicated by the checkmarks shown in FIG. 5. In response to the sending user indicating selection of the persons, images in the image library of the sending user that are detected as including the selected persons corresponding to images 514 and 516, may be shared with the second user. In the example illustrated in FIG. 5, images in the image library of the sending user that correspond to persons in image 514 and 516 may be shared with the second user. In some implementations, the sending user is provided a preview of the images that will be shared with the second user, as illustrated in FIG. 6.

Figure 6:
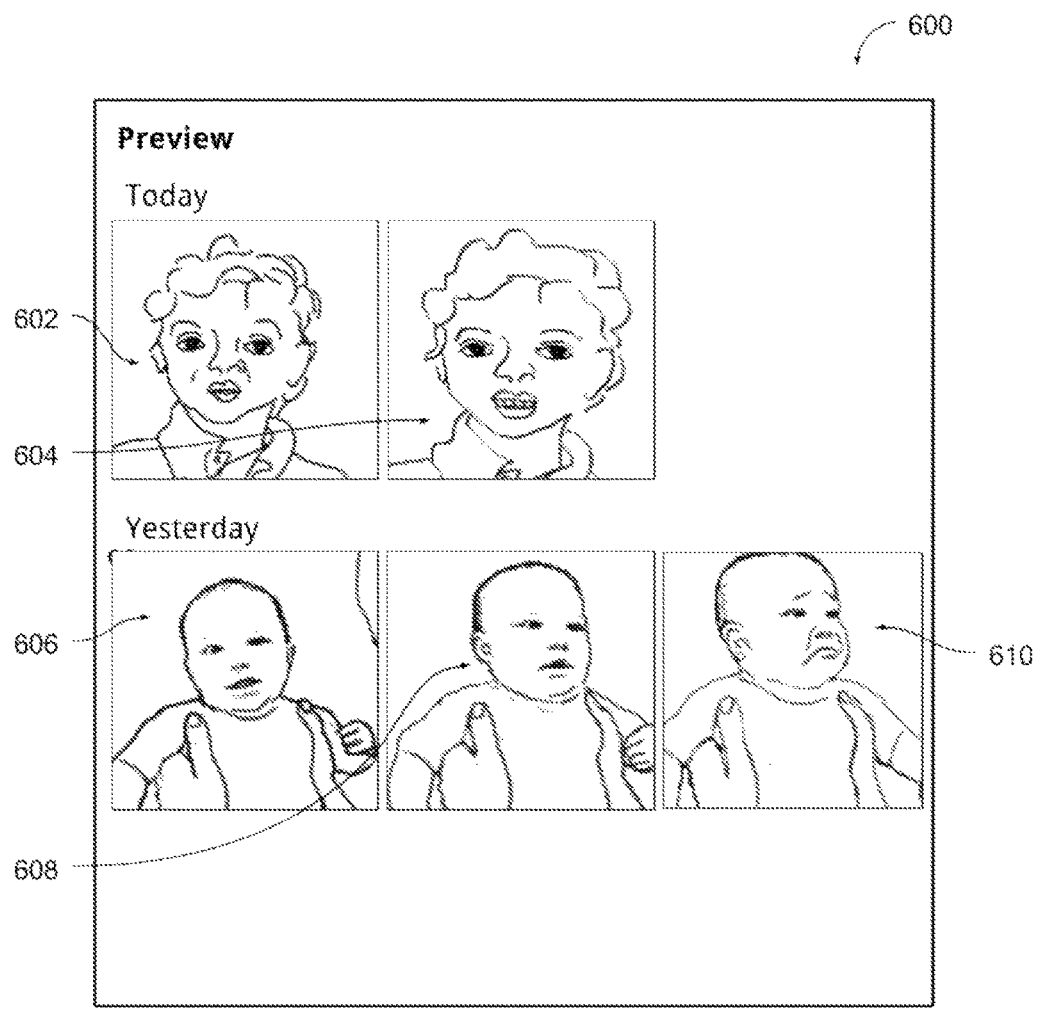
FIG. 6 is a diagrammatic illustration of another example user interface, according to some implementations.

FIG. 6 is a diagrammatic illustration of an example user interface 600, according to some implementations. As illustrated in FIG. 6, when the sending user selects persons depicted in images 514 and 516, a preview of images from the image library of the sending user is provided. In the preview, images 602 and 604 that correspond to the person depicted in image 516, and images 606, 608, and 610 that correspond to the person depicted in image 514, are shown, thus indicating which images from the library of the sending user will be shared. In some implementations, user interface 600 enables the sending user to designate one or more qualifying images to be excluded from sharing (e.g., by selecting the images in the preview) prior to sharing the qualifying images with the second user.

Figure 7C:
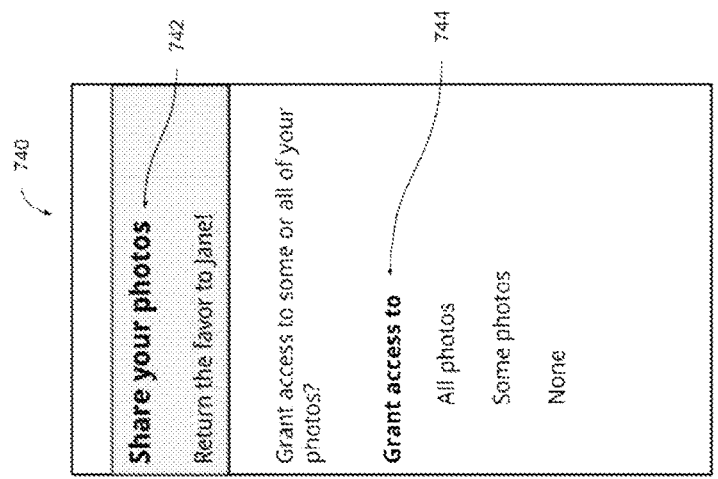
FIG. 7C is a diagrammatic illustration of another example user interface, according to some implementations.
Figure 7B:
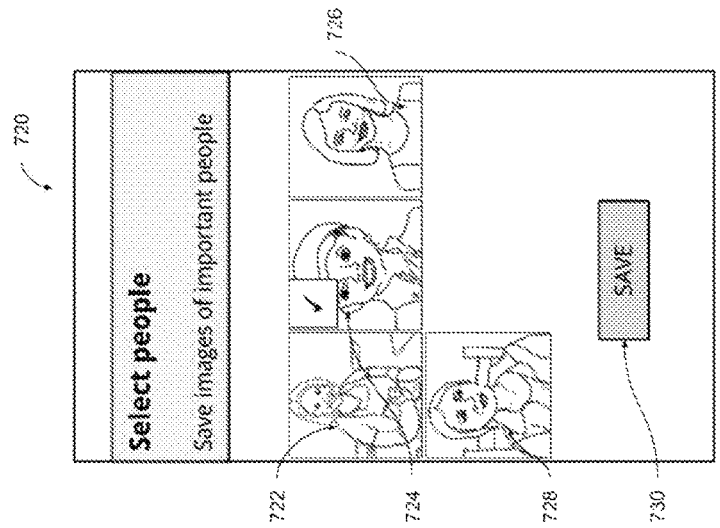
FIG. 7B is a diagrammatic illustration of another example user interface, according to some implementations.
Figure 7A:
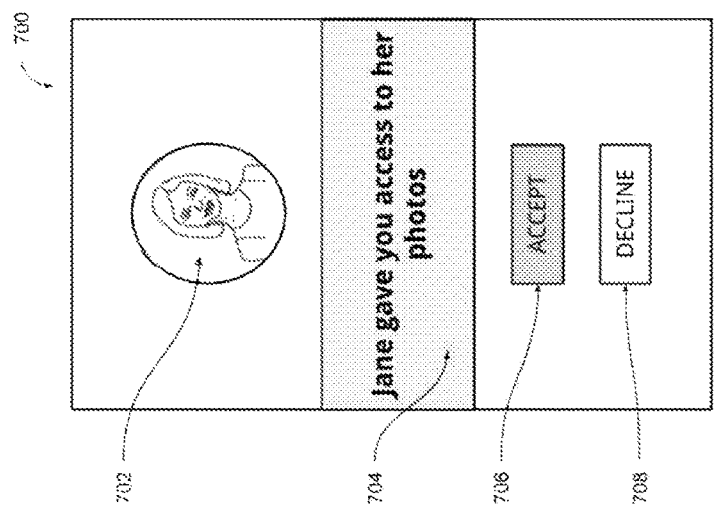
FIG. 7A is a diagrammatic illustration of another example user interface, according to some implementations.

FIG. 7A is a diagrammatic illustration of an example user interface 700, according to some implementations. In some implementations, user interface 700 can be displayed on a device of the recipient user, e.g., the second device of the second user described above. As illustrated in FIG. 7A, user interface 700 includes an indication that a sending user ("Jane") has granted the second user (recipient user) access to images in her image library. In FIG. 7A, user interface element 702 depicts a representative image of the sending user ("Jane") providing a visual indication of the identity of the second user. In some implementations, user interface element 702 may additionally or alternatively include other information such as a user's name, an e-mail address, a social media username, a phone number, etc. User interface 700 also includes a message 704 that indicates that the second user has been granted access by the sending user. In the example illustrated in FIG. 7A, the recipient user is provided with options to accept or decline the access granted by the sending user, e.g., by selecting user interface element 706 ("ACCEPT") or user interface element 708 ("DECLINE"). For example, in some implementations, a recipient user may be restricted to receiving access to images from a limited number of sending users, e.g., a single sending user (partner), three sending users, etc. By providing options to accept or decline, user interface 700 enables the recipient user to select the users whose images they want to access (e.g., a spouse or partner, a parent, or other important persons etc.) and decline access to images from other users. In some implementations, the recipient user may automatically be granted access to the sending user's images.

FIG. 7B is a diagrammatic illustration of an example user interface 720, according to some implementations. As illustrated in FIG. 7B, user interface 720 includes an image grid that depicts representative images 722, 724, 726, and 728. For example, images 722-728 may correspond to persons whose images are in the recipient user's image library. For example, image 724 corresponds to a person whose images are in the images that the sending user has granted access to, e.g., image 602 and 604 shared by the sending user depict the same person as image 724 in the recipient's library. In this example, the recipient user may select one or more persons, e.g., by selecting one or more images 722-728, to indicate automatic saving criteria for shared images. In the example shown in FIG. 7B, the recipient has selected image 724 corresponding to a particular person. The recipient may then indicate that images of the selected person, e.g., the person depicted in image 724, which is the same person depicted in images 602 and 604 shared by the sending user, are to be saved to the recipient's image library by selecting user interface element 730 ("SAVE").

Upon receiving the user selection, images shared by the sending user that depict the person are automatically added to the recipient's image library. Further, any additional images of the person that are shared from the sending user, e.g., at a later time after the save user interface element 730 has been selected by the recipient user, are automatically added to the recipient's image library without any further user input from the recipient. Such automatic addition to image library may provide a benefit of reducing user interaction, e.g., to receive user confirmation to save images to an image library.

While FIG. 7B illustrates an example where the recipient chooses one or more persons whose images are to be saved automatically, in various implementations, the recipient may specify one or more other automatic save criteria. Automatic save criteria may include location criteria (e.g., "automatically save images that I have been granted access to that were taken away from home," "automatically save images that I have been granted access to that were taken in Paris," etc.), time criteria (e.g., "automatically save images that I have been granted access to that were taken on a holiday," "automatically save images that I have been granted access to that were taken within the last month," etc.). In some implementations, automatic save criteria may enable the recipient to specify that certain images are to be not saved automatically, e.g., duplicates or near-duplicates of images that are already in the image library of the recipient, images that do not meet quality criteria, etc.

FIG. 7C is a diagrammatic illustration of an example user interface 740, according to some implementations. As illustrated in FIG. 7C, user interface 740 provides a prompt or message 742 to the recipient to reciprocate by sharing her photos with the sending user ("Share your photos Return the favor to Jane!"). Further, user interface 740 includes user interface element 744 that enables the recipient to specify sharing criteria to share photos with the sending user. In some implementations, the sharing criteria may be specified similar to the sharing criteria as described with reference to FIG. 4. In some implementations, granting access to "some photos" allows the recipient user to specify sharing criteria in more detail on additional displayed user interface screens. In some implementations, the recipient user may initiate automatic sharing reciprocally with the sending user and not with other users.

Figure 8:
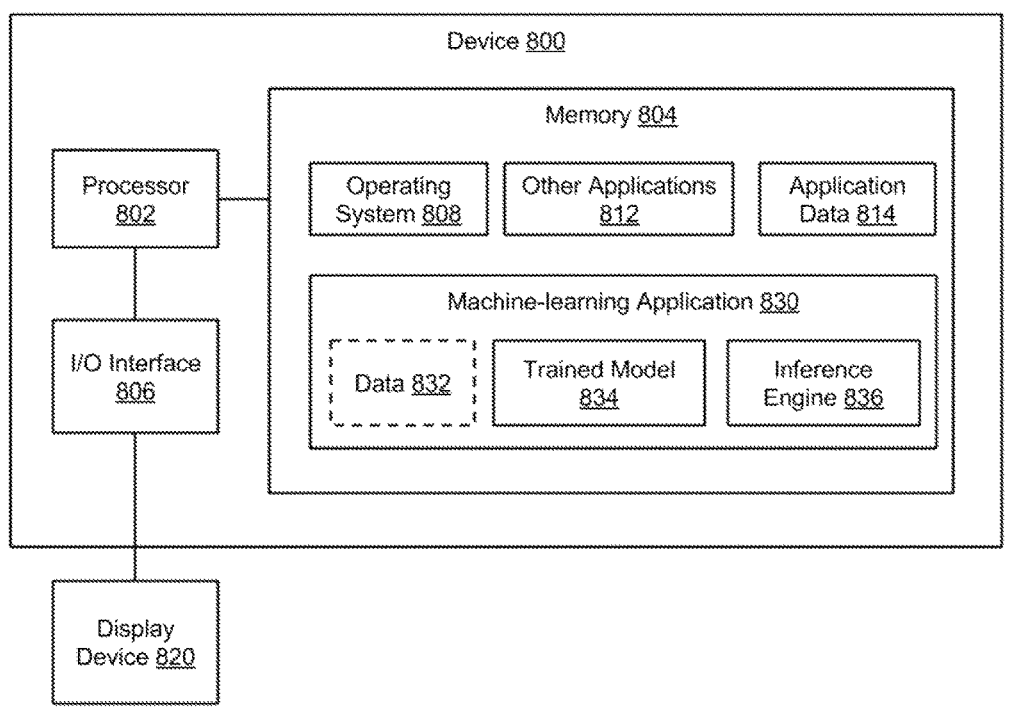
FIG. 8 is a block diagram of an example device which may be used for one or more implementations described herein.

FIG. 8 is a block diagram of an example device 800 which may be used to implement one or more features described herein. In some implementations, device 800 may be used to implement a client device, e.g., any of client devices 120-126 shown in FIG. 1. Alternatively, device 800 can implement a server device, e.g., server system 102. In some implementations, device 800 may be used to implement a client device, a server device, or both client and server devices. Device 800 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In some implementations, a client/server architecture can be used, e.g., a mobile computing device (as a client device) sends user input data to a server device and receives from the server the final output data for output (e.g., for display). In some implementations, all computations can be performed within the mobile app (and/or other apps) on the mobile computing device. In some implementations, computations can be split between the mobile computing device and one or more server devices.

In some implementations, device 800 includes a processor 802, a memory 804, and input/output (I/O) interface 806. Processor 802 can be one or more processors and/or processing circuits to execute program code and control basic operations of the device 800. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 802 may include one or more co-processors that implement neural-network processing. In some implementations, processor 802 may be a processor that processes data to produce probabilistic output, e.g., the output produced by processor 802 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, machine-learning application 830, other applications 812, and application data 814. Other applications 812 may include applications such as a data display engine, web hosting engine, image display engine, notification engine, social networking engine, etc. In some implementations, the machine-learning application 830 and other applications 812 can each include instructions that enable processor 802 to perform functions described herein, e.g., some or all of the methods of FIGS. 2 and 3.

Other applications 812 can include, e.g., image editing applications, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 830 may utilize Bayesian classifiers, support vector machines, neural networks, or other learning techniques. In some implementations, machine-learning application 830 may include a trained model 834, an inference engine 836, and data 832. In some implementations, data 832 may include training data, e.g., data used to generate trained model 834. In some implementations, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 834, training data may include such user data. In implementations where users permit use of their respective user data, data 832 may include permitted data such as images (e.g., photos or other user-generated images), communications (e.g., e-mail; chat data such as text messages, voice, video, etc.), documents (e.g., spreadsheets, text documents, presentations, etc.)

In some implementations, data 832 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 830 excludes data 832. For example, in these implementations, the trained model 834 may be generated, e.g., on a different device, and be provided as part of machine-learning application 830. In various implementations, the trained model 834 may be provided as a data file that includes a model structure or form, and associated weights. Inference engine 836 may read the data file for trained model 834 and implement a neural network with node connectivity, layers, and weights based on the model structure or form specified in trained model 834.

Machine-learning application 830 also includes a trained model 834. In some implementations, the trained model may include one or more model forms or structures. In some implementations, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. In some implementations, nodes of a first layer (e.g., input layer) may receive data as input data 832 or application data 814. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 834 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. In some implementations, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 834 may include embeddings or weights for individual nodes. In some implementations, a model may be initiated as a plurality of nodes organized into layers as specified by the model form or structure. At initialization, a respective weight may be applied to a connection between each pair of nodes that are connected per the model form, e.g., nodes in successive layers of the neural network. In some implementations, the respective weights may be randomly assigned, or initialized to default values. The model may then be trained, e.g., using data 832, to produce a result.

In some implementations, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. In some implementations, the model may be trained to differentiate images such that the model distinguishes abstract images (e.g., synthetic images, human-drawn images, etc.) from natural images (e.g., photos).

In some implementations, a model trained using unsupervised learning may cluster words based on the use of the words in input sentences. In some implementations, unsupervised learning may be used to produce knowledge representations, e.g., that may be used by machine-learning application 830. In various implementations, a trained model includes a set of weights, or embeddings, corresponding to the model structure. In implementations where data 832 is omitted, machine-learning application 830 may include trained model 834 that is based on prior training, e.g., by a developer of the machine-learning application 830, by a third-party, etc. In some implementations, trained model 834 may include a set of weights that are fixed, e.g., downloaded from a server that provides the weights.

Machine-learning application 830 also includes an inference engine 836. Inference engine 836 is configured to apply the trained model 834 to data, such as application data 814, to provide an inference. In some implementations, inference engine 836 may include software code to be executed by processor 802. In some implementations, inference engine 836 may specify circuit configuration (e.g., for a programmable processor, for a field programmable gate array (FPGA), etc.) enabling processor 802 to apply the trained model. In some implementations, inference engine 836 may include software instructions, hardware instructions, or a combination. In some implementations, inference engine 836 may offer an application programming interface (API) that can be used by operating system 808 and/or other applications 812 to invoke inference engine 836, e.g., to apply trained model 834 to application data 814 to generate an inference.

Machine-learning application 830 may provide several technical advantages. For example, when trained model 834 is generated based on unsupervised learning, trained model 834 can be applied by inference engine 836 to produce knowledge representations (e.g., numeric representations) from input data, e.g., application data 814. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 836. In some implementations, knowledge representations generated by machine-learning application 830 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 830 may be implemented in an offline manner. In these implementations, trained model 834 may be generated in a first stage, and provided as part of machine-learning application 830. In some implementations, machine-learning application 830 may be implemented in an online manner. In some of these implementations, an application that invokes machine-learning application 830 (e.g., operating system 808, one or more of other applications 812) may utilize an inference produced by machine-learning application 830, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 834, e.g., to update embeddings for trained model 834.

In some implementations, machine-learning application 830 may be implemented in a manner that can adapt to particular configuration of device 800 on which the machine-learning application 830 is executed. In some implementations, machine-learning application 830 may determine a computational graph that utilizes available computational resources, e.g., processor 802. In some implementations, if machine-learning application 830 is implemented as a distributed application on multiple devices, machine-learning application 830 may determine computations to be carried out on individual devices in a manner that optimizes computation. In some implementations, machine-learning application 830 may determine that processor 802 includes a GPU with a particular number of GPU cores (e.g., 1000) and implement the inference engine accordingly (e.g., as 1000 individual processes or threads).

In some implementations, machine-learning application 830 may implement an ensemble of trained models. In some implementations, trained model 834 may include a plurality of trained models that are each applicable to same input data. In these implementations, machine-learning application 830 may choose a particular trained model, e.g., based on available computational resources, success rate with prior inferences, etc. In some implementations, machine-learning application 830 may execute inference engine 836 such that a plurality of trained models is applied. In these implementations, machine-learning application 830 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. In some implementations, such approaches may be suitable when there is a time limit specified while invoking the machine-learning application, e.g., by operating system 808 or one or more other applications 812.

In different implementations, machine-learning application 830 can produce different types of outputs. In some implementations, machine-learning application 830 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 830 may produce an output video with a particular effect applied, e.g., rendered in a comic-book or particular artist's style, when trained model 834 is trained using training data from the comic book or particular artist, etc. In some implementations, machine-learning application 830 may produce an output based on a format specified by an invoking application, e.g. operating system 808 or one or more other applications 812. In some implementations, an invoking application may be another machine-learning application. In some implementations, such configurations may be used in generative adversarial networks, where an invoking machine-learning application is trained using output from machine-learning application 830 and vice-versa.

Any of software in memory 804 can alternatively be stored on any other suitable storage location or computer-readable medium. In addition, memory 804 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. Interfaced devices can be included as part of the device 800 or can be separate and communicate with the device 800. In some implementations, network communication devices, storage devices (e.g., memory and/or database 106), and input/output devices can communicate via I/O interface 806. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 806 can include one or more display devices 820 that can be used to display content, e.g., images, video, and/or a user interface of an output application as described herein. Display device 820 can be connected to device 800 via local connections (e.g., display bus) and/or via networked connections and can be any suitable display device. Display device 820 can include any suitable display device such as an LCD, LED, or plasma display screen, CRT, television, monitor, touchscreen, 3-D display screen, or other visual display device. In some implementations, display device 820 can be a flat display screen provided on a mobile device, multiple display screens provided in a goggles or headset device, or a monitor screen for a computer device.

The I/O interface 806 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 8 shows one block for each of processor 802, memory 804, I/O interface 806, and software blocks 808, 812, and 830. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While some components are described as performing blocks and operations as described in some implementations herein, any suitable component or combination of components of network environment 100, device 800, similar systems, or any suitable processor or processors associated with such a system, may perform the blocks and operations described.

Methods described herein can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In some implementations, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. In some implementations, users can be provided with one or more such control options over a communication network. In addition, certain data may be treated in one or more ways before it is stored or used so that personally identifiable information is removed. In some implementations, a user's identity may be treated so that no personally identifiable information can be determined. In some implementations, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
causing display of a plurality of images in a user interface on a first device to a first user, wherein each of the plurality of images depicts a different person, wherein the plurality of images are obtained from a library of images associated with the first user;
receiving a selection of a particular image of the plurality of images based on first user input received by the first device;
determining a person identifier indicating a particular person depicted in the selected particular image, wherein the person identifier is designated as a person sharing criterion;
obtaining a first image associated with the first user, wherein the first image is obtained from the library of images associated with the first user, wherein the first image is not included in the plurality of images;
programmatically analyzing the first image to determine that the first image depicts a person that matches the person sharing criterion;
in response to the determination that the first image depicts the person that matches the person sharing criterion:
initiating a delay period associated with the first user for the first image;
assigning a status indicator to the first image, wherein the status indicator indicates a first status that the first image is to be shared with a second user;
determining whether second user input from the first user is received at the first device during the delay period, the second user input indicating that the first image is not to be shared with the second user; and
if it is determined that the second user input is received, updating the status indicator to a second status that indicates the first image is not to be shared with the second user; and
based on the determination that the first image depicts the person that matches the person sharing criterion, and in response to an expiration of the delay period and the status indicator indicating the first status, updating an access permission for the first image of the library of images associated with the first user to grant access to the first image to the second user of a second device over a communication network.

2. The computer-implemented method of claim 1, wherein the person sharing criterion includes a face criterion that specifies a particular face identity, and wherein programmatically analyzing the first image comprises:
applying an image classifier to determine that the first image depicts a face of the particular face identity, wherein applying the image classifier is based on pixel values of the pixels of the first image.

3. The computer-implemented method of claim 1, wherein updating the access permission for the first image is based on a confidence level of determining that the first image depicts the person that matches the person sharing criterion, wherein the confidence level meets a first threshold.

4. The computer-implemented method of claim 3, further comprising:
checking whether the confidence level does not meet the first threshold and meets a second threshold that indicates a lesser confidence that the first image depicts the person that matches the person sharing criterion; and
in response to determining that the confidence level meets the second threshold, causing the first image to be displayed for selection by user input to the first device from the first user to update the access permission for the first image to grant access to the second user.

5. The computer-implemented method of claim 1, wherein updating the access permission of the first image comprises automatically adding the first image to an image library of the second user.

6. The computer-implemented method of claim 1, wherein image data of the first image is stored on a server device in communication with the first device over the communication network, and wherein a first data pointer referring to the image data of the first image is stored on the first device, wherein updating the access permission of the first image includes sending a second data pointer referring to the image data of the first image to the second device over the communication network.

7. The computer-implemented method of claim 1, wherein programmatically analyzing the first image includes determining whether the first image meets one or more additional sharing criteria.

8. The computer-implemented method of claim 7, wherein the one or more additional sharing criteria include an image feature criterion that specifies an image content feature, and wherein programmatically analyzing the first image comprises:
applying an image classifier to determine a feature vector that includes a plurality of content features of the first image, wherein the feature vector is based on pixel values of the first image; and
comparing the feature vector with the image feature criterion to determine whether the first image matches the image feature criterion.

9. The computer-implemented method of claim 7, wherein the one or more additional sharing criteria include a time criterion, and wherein programmatically analyzing the first image comprises:
determining a creation time for the first image based on timestamp metadata associated with the first image; and
comparing the creation time with the time criterion to determine whether the first image matches the time criterion.

10. The computer-implemented method of claim 7, wherein the one or more additional sharing criteria include a location criterion, wherein the location criterion specifies a particular location, and wherein programmatically analyzing the first image comprises:
determining a location associated with the first image based on one or more of: location metadata associated with the first image and a content feature detected as depicted in one or more pixels of the first image; and
comparing the location associated with the first image with the location criterion to determine whether the first image matches the particular location.

11. A system comprising:
a storage device; and
at least one processor configured to access the storage device and configured to perform operations comprising:
causing display of a plurality of images in a user interface on a first device to a first user, wherein each of the plurality of images depicts a different person, wherein the plurality of images are obtained from a library of images associated with the first user;
receiving a selection of a particular image of the plurality of images based on first user input received by the first device;
determining a person identifier indicating a particular person depicted in the selected particular image, wherein the person identifier is designated as a person sharing criterion;
obtaining a first image associated with the first user, wherein the first image is provided in the library of images associated with the first user, wherein the first image is not included in the library of images;
programmatically analyzing the first image to determine that the first image depicts a person that matches the person sharing criterion;
in response to the determination that the first image depicts the person that matches the person sharing criterion:
initiating a delay period associated with the first user for the first image;
assigning a status indicator to the first image, wherein the status indicator indicates a first status that the first image is to be shared with a second user;
determining whether second user input from the first user is received at the first device during the delay period, the second user input indicating that the first image is not to be shared with the second user; and
if it is determined that the second user input is received, updating the status indicator to a second status that indicates the first image is not to be shared with the second user; and
based on the determination that the first image depicts the person that matches the person sharing criterion, and in response to an expiration of the delay period and the status indicator indicating the first status, updating an access permission for the first image in the library of images associated with the first user to grant access to the first image to the second user of a second device over a communication network.

12. The system of claim 11, wherein the person sharing criterion includes a face criterion that specifies a particular face identity, and wherein the operation of programmatically analyzing the first image comprises:
applying an image classifier to determine that the first image depicts a face of the particular face identity, wherein applying the image classifier is based on pixel values of the pixels of the first image.

13. The system of claim 11, wherein the operation of updating the access permission for the first image is based on a confidence level of determining that the first image depicts the person that matches the person sharing criterion, wherein the confidence level meets a first threshold.

14. The system of claim 13, wherein the operations further comprise:
checking whether the confidence level does not meet the first threshold and meets a second threshold that indicates a lesser confidence that the first image depicts the person that matches the person sharing criterion; and
in response to determining that the confidence level meets the second threshold, causing the first image to be displayed for selection by user input to the first device from the first user to update the access permission for the first image to grant access to the second user.

15. The system of claim 11, wherein the operation of updating the access permission of the first image comprises automatically adding the first image to an image library of the second user.

16. The system of claim 11, wherein image data of the first image is stored on a server device in communication with the first device over the communication network, and wherein a first data pointer referring to the image data of the first image is stored on the first device, wherein the operation of updating the access permission of the first image includes sending a second data pointer referring to the image data of the first image to the second device over the communication network.

17. The system of claim 11, wherein the operation of programmatically analyzing the first image includes determining whether the first image meets one or more additional sharing criteria, wherein the one or more additional sharing criteria include an image feature criterion that specifies an image content feature, and wherein the operation of programmatically analyzing the first image comprises:
applying an image classifier to determine a feature vector that includes a plurality of content features of the first image, wherein the feature vector is based on pixel values of the first image; and
comparing the feature vector with the image feature criterion to determine whether the first image matches the image feature criterion.

18. The system of claim 11, wherein the operation of programmatically analyzing the first image includes determining whether the first image meets one or more additional sharing criteria, wherein the one or more additional sharing criteria include a time criterion, and wherein programmatically analyzing the first image comprises:
determining a creation time for the first image based on timestamp metadata associated with the first image; and
comparing the creation time with the time criterion to determine whether the first image matches the time criterion.

19. The system of claim 11, wherein the operation of programmatically analyzing the first image includes determining whether the first image meets one or more additional sharing criteria, wherein the one or more additional sharing criteria include a location criterion, wherein the location criterion specifies a particular location, and wherein programmatically analyzing the first image comprises:
determining a location associated with the first image based on one or more of: location metadata associated with the first image and a content feature detected as depicted in one or more pixels of the first image; and
comparing the location associated with the first image with the location criterion to determine whether the first image matches the particular location.

20. A non-transitory computer readable medium having stored thereon software instructions that, when executed by at least one processor, cause the at least one processor to perform operations including:
causing display of a plurality of images in a user interface on a first device to a first user, wherein each of the plurality of images depicts a different person, wherein the plurality of images are obtained from a library of images associated with the first user;
receiving a selection of a particular image of the plurality of images based on first user input received by the first device;
determining a person identifier indicating a particular person depicted in the selected particular image, wherein the person identifier is designated as a person sharing criterion;
obtaining a first image associated with the first user, wherein the first image is obtained from the library of images associated with the first user, wherein the first image is not included in the plurality of images;
programmatically analyzing the first image to determine that the first image depicts a person that matches the person sharing criterion;
in response to the determination that the first image depicts the person that matches the person sharing criterion:
initiating a delay period associated with the first user for the first image;
assigning a status indicator to the first image, wherein the status indicator indicates a first status that the first image is to be shared with a second user;
determining whether second user input from the first user is received at the first device during the delay period, the second user input indicating that the first image is not to be shared with the second user; and
if it is determined that the second user input is received, updating the status indicator to a second status that indicates the first image is not to be shared with the second user; and
based on the determination that the first image depicts the person that matches the person sharing criterion, and in response to an expiration of the delay period and the status indicator indicating the first status, updating an access permission for the first image of the library of images associated with the first user to grant access to the first image to the second user of a second device over a communication network.

* * * * *